(12) United States Patent
Watanabe et al.

(10) Patent No.: US 11,251,687 B2
(45) Date of Patent: Feb. 15, 2022

(54) COIL SEGMENT FORMING APPARATUS AND MANUFACTURING APPARATUS OF ELECTRICAL ROTATING MACHINE

(71) Applicant: ODAWARA ENGINEERING CO., LTD., Kanagawa (JP)

(72) Inventors: Hisayoshi Watanabe, Ashigarakami-gun (JP); Noburo Miyawaki, Ashigarakami-gun (JP); Yuji Miyazaki, Ashigarakami-gun (JP)

(73) Assignee: ODAWARA ENGINEERING CO., LTD., Kanagawa (JP)

( * ) Notice: Subject to any disclaimer, the term of this patent is extended or adjusted under 35 U.S.C. 154(b) by 369 days.

(21) Appl. No.: 16/216,165

(22) Filed: Dec. 11, 2018

(65) Prior Publication Data

US 2019/0109524 A1   Apr. 11, 2019

Related U.S. Application Data

(63) Continuation of application No. PCT/JP2018/017764, filed on May 8, 2018.

(30) Foreign Application Priority Data

Aug. 4, 2017   (JP) .............................. JP2017-151577

(51) Int. Cl.
*B23P 19/00* (2006.01)
*H05K 13/04* (2006.01)
(Continued)

(52) U.S. Cl.
CPC ............. *H02K 15/064* (2013.01); *H02K 3/04* (2013.01); *H02K 15/04* (2013.01); *H02K 15/0421* (2013.01); *H02K 15/067* (2013.01)

(58) Field of Classification Search
CPC .. H02K 15/04; H02K 15/0421; H02K 15/064; H02K 15/067; H02K 3/04
See application file for complete search history.

(56) References Cited

U.S. PATENT DOCUMENTS 9,613,750 B2    4/2017  Watanabe et al.
9,634,548 B2 *  4/2017  Tsuiki ................ H02K 15/0435
(Continued)

FOREIGN PATENT DOCUMENTS

CN   103828203 A   5/2014
JP   58-22563 A    2/1983
(Continued)

OTHER PUBLICATIONS

International Search Report in Japanese and Written Opinion in Japanese dated Jun. 26, 2018, issued in counterpart International Application No. PCT/JP2018/017764 (9 pages).
(Continued)

*Primary Examiner* — Paul D Kim
(74) *Attorney, Agent, or Firm* — Westerman, Hattori, Daniels & Adrian, LLP

(57) ABSTRACT

A coil segment forming apparatus includes a second bending section for bending a first bent body consisting of a pair of slot insertion portions that are substantially parallel to each other and a linking portion for connecting the pair of slot insertion portions formed in the same plane. The bending of the first bent body is carried out in a plane perpendicular to the aforementioned same plane. The second bending section has a plurality of pairs of press jigs arranged to oppose to each other in directions intersecting with the aforementioned same plane for pinching and pressing the linking portion, and a plurality of drive mechanisms for moving respectively the plurality of pairs of press jigs in directions intersecting with the aforementioned same plane based on moving
(Continued)

amounts respectively set depending on forming conditions of the coil segment to be formed.

10 Claims, 17 Drawing Sheets

(51) Int. Cl.
*H02K 15/06* (2006.01)
*H02K 15/04* (2006.01)
*H02K 3/04* (2006.01)

(56) References Cited

U.S. PATENT DOCUMENTS

| | | | |
|---|---|---|---|
| 9,859,775 B2* | 1/2018 | Hashimoto | H02K 15/045 |
| 10,971,979 B2* | 4/2021 | Miyazaki | H02K 15/0421 |
| 2008/0093948 A1* | 4/2008 | Naganawa | H02K 15/063 |
| | | | 310/203 |
| 2012/0181891 A1 | 7/2012 | Yamada et al. | |
| 2012/0223611 A1 | 9/2012 | Watanabe et al. | |
| 2015/0288262 A1 | 10/2015 | Tsuiki et al. | |
| 2019/0190359 A1* | 6/2019 | Miyawaki | H02K 15/067 |

FOREIGN PATENT DOCUMENTS

| | | |
|---|---|---|
| JP | 6-284651 A | 10/1994 |
| JP | 2004-297863 A | 10/2004 |
| JP | 2015-19439 A | 1/2015 |
| WO | 2014/065026 A1 | 5/2014 |
| WO | 2015/189871 A1 | 12/2015 |

OTHER PUBLICATIONS

Extended Search Report dated Oct. 4, 2019, issued in counterpart EP Application No. 18826479.0 (10 pages).
Office Action dated Aug. 13, 2021, issued in counterpart CN Application No. 201880002311.8, with English Translation. (19 pages).

* cited by examiner

COIL SEGMENT FORMING APPARATUS AND MANUFACTURING APPARATUS OF ELECTRICAL ROTATING MACHINE

FIELD OF THE INVENTION

The present invention relates to a coil segment forming apparatus and a coil segment forming method used for coil formation of a stator and a rotor in an electrical rotating machine such as a motor or a generator, and to a manufacturing apparatus of the electrical rotating machine.

BACKGROUND ART

Known is a segment-type coil as a stator coil or a rotor coil of the electrical rotating machine. This segment coil is formed by inserting a plurality of coil segments (hairpins), each obtained by bending a wire rod in a U-shape, into a plurality of slots arranged along the circumferential direction of the stator or the rotor, respectively, and by joining together free ends of these inserted coil segments by welding. Each coil segment has a U-shape consisting of a pair of slot insertion portions that are substantially parallel to each other and a linking portion for connecting the pair of slot insertion portions.

In the linking portion (coil-end portion) of the coil segment, in general, a step part with a crank shape for lane change is formed. This step part has the role of displacing the pair of slot insertion portions with each other in the radial direction of the slot in order to avoid interference between the coil segment inserted into the slot and other coil segment.

As for a method of forming such crank-shaped step part, Patent Document 1 discloses a method of supporting in the horizontal plane the both end portions of the wire rod already cut into a predetermined length, moving a pair of first press dies closer to the wire rod in this state from its both sides, and pressing the wire rod by the pair of first press dies. The pair of first press dies can be freely in contact with and away from the wire rod in the horizontal plane and have concave/convex structure corresponding to the crank shape, respectively. Patent Document 1 also discloses a method of forming the linking portion in a curved shape. In this method, the wire rod is pressed by moving, closer to the wire rod from its both sides, a pair of second press dies that are freely in contact with and away from the wire rod in the vertical plane perpendicular to the above-mentioned horizontal plane and have a convex curved surface and a concave curved surface corresponding to the convex curved surface, respectively.

RELATED ART DOCUMENT

Patent Document

Patent Document 1: Japanese Patent Publication No. 2004-297863A

SUMMARY OF THE INVENTION

Problem to be Solved by the Invention

According to the conventional coil segment forming method disclosed in Patent Document 1, the crank shape of the linking portion of the coil segment are defined by a fixed die geometry (dimension and shape of pressing surface) of the first press die or the first press bending die, and the curved shape of the linking portion of the coil segment are defined by a fixed die geometry (dimension and shape of pressing surface) of the second press die or the first press bending die. Therefore, in order to change the crank shape and the curvature factor of the curved shape of the linking portion, it is necessary to exchange the press die. In general, a great variety of coil segments with different shoulder lengths and angles of the U-shape linking portions and with different widths between the slot insertion portions are mixed in a single coil. Thus, according to the conventional method, even if in case of fabricating a single coil, press dies with various kinds of shape have to be prepared and exchanged with each other for making these coil segments with various kinds of shape. It is possible to reduce the number of exchange of the press die by stocking many of the coil segments with the same shape fabricated in advance by using the same press die and by taking out the stocked coil segment at the time of need. However, the management of the stocked coil segments with various kinds of shape is complicated, and the management of fabricating the coil segments with various kinds of shape without overs and shorts is also complicated. In another method of shaping the wire rod, using two kinds of pair press dies movable in the different planes, the wire rod is pressed by using one of these pair press dies, then this pair press dies is separated from each other, and thereafter the wire rod is pressed by moving the other one of the pair press dies closer to the wire rod. However, according to this method, since there is a large loss in shaping time caused by the movement of the press dies, the efficiency in the pressing operations becomes lowered.

It is therefore an object of the present invention to provide a coil segment forming apparatus, a coil segment forming method and a manufacturing apparatus of an electrical rotating machine, whereby coil segments with various kinds of shape can be formed without exchanging a press die.

Another object of the present invention is to provide a coil segment forming apparatus, a coil segment forming method and a manufacturing apparatus of an electrical rotating machine, whereby there in no need of forming and stocking in advance of many coil segments of various kinds of shape.

Further object of the present invention is to provide a coil segment forming apparatus, a coil segment forming method and a manufacturing apparatus of an electrical rotating machine, whereby a transitional time between different shape-forming processes (from the forming process of a crank shape to the forming process of a curved shape, or from the forming process of a curved shape to the forming process of a crank shape) can be reduced.

Means to Solve the Problem

According to the present invention, a coil segment forming apparatus includes a second bending section for bending a first bent body consisting of a pair of slot insertion portions that are substantially parallel to each other and a linking portion for connecting the pair of slot insertion portions formed in the same plane. The bending of the first bent body is carried out in a plane perpendicular to the aforementioned same plane. The second bending section has a plurality of pairs of press jigs arranged to oppose to each other in directions intersecting with the aforementioned same plane for pinching and pressing the linking portion, and a plurality of drive mechanisms for moving respectively the plurality of pairs of press jigs in directions intersecting with the aforementioned same plane based on moving amounts respectively set depending on forming conditions of the coil segment to be formed.

The positions of the press jigs for pinching and pressing the linking portion of the first bent body are moved based on moving amounts set depending on shape conditions of the coil segment to be formed, in other words, moving amounts of the press jigs are set for each coil segment. Thus, since no press die having a shape similar to the target shape is necessary to use even when coil segments having various shapes are to be fabricated, the manufacturing cost becomes cheap. Also, since any die exchange is needless for forming coil segments of various kinds of shape, no downtime due to the die exchange occurs resulting that shortening in working hours can be expected and the work itself becomes easy and assured. As a result, working efficiency of the whole works for forming the coil segment can be extremely improved. Further, since moving amounts of the press jigs can be set for each coil segment to be formed, it is not necessary to form in advance and to stock many coil segments with various kinds of shape, the management of the stocked coil segments with various kinds of shape becomes needless. Still further, coil segments with various kinds of shape can be easily formed each time when necessary. Further, it is possible to quickly perform the transformation from one forming process to the other forming process by changing the moving amount of the press jigs. That is, it is possible to perform the transformation from the curved shape forming process to the misalignment forming processor the transformation from the misalignment forming process to the curved shape forming process by changing the moving amount (numerical value) of the press jigs, and therefore a plurality kind of forming processes in the second bending section can be quickly performed without changing the forming dies.

It is preferred that the plurality of drive mechanisms are constituted to move the plurality of pairs of press jigs based on data of the set moving amounts, respectively.

It is also preferred that the plurality of drive mechanisms are constituted to move the plurality of pairs of press jigs in a direction perpendicular to the aforementioned same plane and/or in a direction obliquely intersecting with the aforementioned same plane so as to forma misalignment along a direction intersecting with the aforementioned same plane in the linking portion.

It is further preferred that the plurality of drive mechanisms are constituted to move the plurality of pairs of press jigs in a direction perpendicular to the aforementioned same plane and thereafter to move a pair of press jigs, among the plurality of pairs of press jigs, in a direction obliquely intersecting with the aforementioned same plane so as to form a misalignment along a direction intersecting with the aforementioned same plane in the linking portion.

In this case, it is preferred that drive mechanisms, among the plurality of drive mechanisms, for moving the pair of press jigs in a direction obliquely intersecting with the aforementioned same plane are constituted to move the pair of press jigs in one direction in the aforementioned same plane and simultaneously to move the pair of press jigs in a direction perpendicular to the one direction.

It is further preferred that the plurality of drive mechanisms are constituted to move a pair of press jigs after bending the linking portion to form a curved shape so as to form a misalignment in the linking portion.

In this case, it is preferred that a pair of press jigs, among the plurality of pairs of press jigs, is capable of rotating in a plane perpendicular to the aforementioned same plane and capable of changing a curvature factor of the curved shape of the linking portion by the rotating.

It is further preferred that each pair of the plurality of pairs of press jigs includes a concave shaped press jig having a curved concave press surface and a convex shaped press jig having a curved convex press surface.

According to the present invention, also, a coil segment forming method includes a step of pinching and pressing a linking portion of a first bent body consisting of a pair of slot insertion portions that are substantially parallel to each other and the linking portion for connecting the pair of slot insertion portions formed in the same plane, by a plurality of pairs of press jigs arranged to oppose to each other in a direction intersecting with the same plane, and a step of bending the linking portion in a direction intersecting with the aforementioned same plane, by moving respectively the plurality of pairs of press jigs in the direction intersecting with the aforementioned same plane based on moving amounts respectively set depending on forming conditions of the coil segment to be formed.

The positions of the press jigs for pinching and pressing the linking portion of the first bent body are moved based on moving amounts set depending on shape conditions of the coil segment to be formed, in other words, moving amounts of the press jigs are set for each coil segment. Thus, since no press die having a shape similar to the target shape is necessary to use even when coil segments having various shapes are to be fabricated, the manufacturing cost becomes cheap. Also, since any die exchange is needless for forming coil segments of various kinds of shape, no downtime due to the die exchange occurs resulting that shortening in working hours can be expected and the work itself becomes easy and assured. As a result, working efficiency of the whole works for forming the coil segment can be extremely improved. Further, since moving amounts of the press jigs can be set for each coil segment to be formed, it is not necessary to form in advance and to stock many coil segments with various kinds of shape, the management of the stocked coil segments with various kinds of shape becomes needless. Still further, coil segments with various kinds of shape can be easily formed each time when necessary. Further, it is possible to quickly perform the transformation from one forming process to the other forming process by changing the moving amount of the press jigs. That is, it is possible to perform the transformation from the curved shape forming process to the misalignment forming processor the transformation from the misalignment forming process to the curved shape forming process by changing the moving amount (numerical value) of the press jigs, and therefore a plurality kind of forming processes in the second bending section can be quickly performed without changing the forming dies.

According to the present invention, further, a manufacturing apparatus of an electrical rotating machine includes a second bending section for bending a first bent body consisting of a pair of slot insertion portions that are substantially parallel to each other and a linking portion for connecting the pair of slot insertion portions formed in the same plane, the bending of the first bent body being carried out in a plane perpendicular to the aforementioned same plane. The second bending section has a plurality of pairs of press jigs arranged to oppose to each other in directions intersecting with the aforementioned same plane for pinching and pressing the linking portion, and a plurality of drive mechanisms for moving respectively the plurality of pairs of press jigs in directions intersecting with the aforementioned same plane based on moving amounts respectively set depending on forming conditions of the coil segment to be formed. This manufacturing apparatus of an electrical rotating machine has a wire rod providing section for supplying a wire rod, a first bending section for bending in the same plane a linear wire rod supplied from the wire rod providing section into a predetermined shape consisting of a pair of slot insertion portions that are substantially parallel to each other and a linking portion for connecting the pair of slot insertion portions, a second bending section for bending the wire rod bent by the first bending section in a plane perpendicular to the aforementioned same plane, and a coil assembling section for assembling coil segments bent by the second bending section in line with slots of the electrical rotary machine.

The positions of the press jigs for pinching and pressing the linking portion of the first bent body are moved based on moving amounts set depending on shape conditions of the coil segment to be formed, in other words, moving amounts of the press jigs are set for each coil segment. Thus, since no press die having a shape similar to the target shape is necessary to use even when coil segments having various shapes are to be fabricated, the manufacturing cost becomes cheap. Also, since any die exchange is needless for forming coil segments of various kinds of shape, no downtime due to the die exchange occurs resulting that shortening in working hours can be expected and the work itself becomes easy and assured. As a result, working efficiency of the whole works for forming the coil segment can be extremely improved. Further, since moving amounts of the press jigs can be set for each coil segment to be formed, it is not necessary to form in advance and to stock many coil segments with various kinds of shape, the management of the stocked coil segments with various kinds of shape becomes needless. Still further, coil segments with various kinds of shape can be easily formed each time when necessary. Further, it is possible to quickly perform the transformation from one forming process to the other forming process by changing the moving amount of the press jigs. That is, it is possible to perform the transformation from the curved shape forming process to the misalignment forming processor the transformation from the misalignment forming process to the curved shape forming process by changing the moving amount (numerical value) of the press jigs, and therefore a plurality kind of forming processes in the second bending section can be quickly performed without changing the forming dies.

It is preferred that the plurality of drive mechanisms are constituted to move the plurality of pairs of press jigs based on data of the set moving amounts, respectively.

It is also preferred that the plurality of drive mechanisms are constituted to move the plurality of pairs of press jigs in a direction perpendicular to the aforementioned same plane and/or in a direction obliquely intersecting with the aforementioned same plane so as to forma misalignment along a direction intersecting with the aforementioned same plane in the linking portion.

It is further preferred that the plurality of drive mechanisms are constituted to move the plurality of pairs of press jigs in a direction perpendicular to the aforementioned same plane and thereafter to move a pair of press jigs, among the plurality of pairs of press jigs, in a direction obliquely intersecting with the aforementioned same plane so as to form a misalignment along a direction intersecting with the aforementioned same plane in the linking portion.

In this case, it is preferred that drive mechanisms, among the plurality of drive mechanisms, for moving the pair of press jigs in a direction obliquely intersecting with the aforementioned same plane are constituted to move the pair of press jigs in one direction in the aforementioned same plane and simultaneously to move the pair of press jigs in a direction perpendicular to the one direction.

It is further preferred that the plurality of drive mechanisms are constituted to move a pair of press jigs after bending the linking portion to form a curved shape so as to form a misalignment in the linking portion.

It is further preferred that a pair of press jigs, among the plurality of pairs of press jigs, is capable of rotating in a plane perpendicular to the aforementioned same plane and capable of changing a curvature factor of the curved shape of the linking portion by the rotating.

It is further preferred that each pair of the plurality of pairs of press jigs has a concave shaped press jig having a curved concave press surface and a convex shaped press jig having a curved convex press surface.

Effect of the Invention

According to the present invention, the positions of the press jigs for pinching and pressing the linking portion of the first bent body are moved based on moving amounts set depending on shape conditions of the coil segment to be formed, in other words, moving amounts of the press jigs are set for each coil segment. Thus, since no press die having a shape similar to the target shape is necessary to use even when coil segments having various shapes are to be fabricated, the manufacturing cost becomes cheap. Also, since any die exchange is needless for forming coil segments of various kinds of shape, no downtime due to the die exchange occurs resulting that shortening in working hours can be expected and the work itself becomes easy and assured. As a result, working efficiency of the whole works for forming the coil segment can be extremely improved. Further, since moving amounts of the press jigs can be set for each coil segment to be formed, it is not necessary to form in advance and to stock many coil segments with various kinds of shape, the management of the stocked coil segments with various kinds of shape becomes needless. Still further, coil segments with various kinds of shape can be easily formed each time when necessary. Further, it is possible to quickly perform the transformation from one forming process to the other forming process by changing the moving amount of the press jigs. That is, it is possible to perform the transformation from the curved shape forming process to the misalignment forming process or the transformation from the misalignment forming process to the curved shape forming process by changing the moving amount (numerical value) of the press jigs, and therefore a plurality kind of forming processes in the second bending section can be quickly performed without changing the forming dies.

EMBODIMENTS FOR CARRYING OUT THE INVENTION

Hereinafter embodiments of the present invention will be described with reference to the drawings. In the following embodiments, a rectangular wire with a quadrangular cross-section will be used as for a wire rod. However, a single line wire or a stranded line wire with any shaped cross-section such as for example a circular-shaped cross-section, a square-shaped cross-section, a polygonal-shaped cross-section or other-shaped cross-section may be applicable as for the wire rod, according to the present invention.

Figure 1:
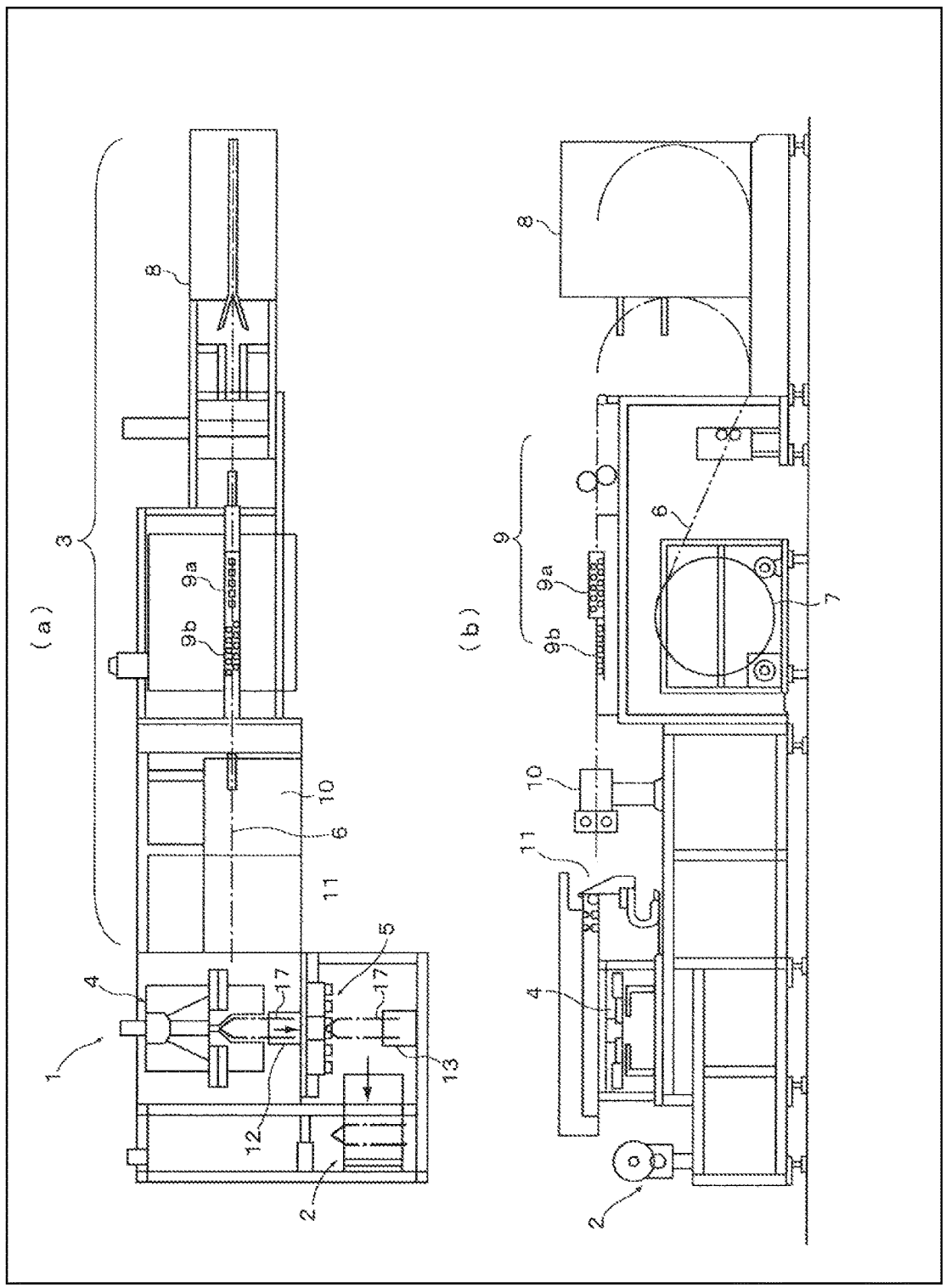
FIG. 1 is views schematically illustrating a partial constitution of a manufacturing apparatus of an electrical rotating machine in an embodiment according to the present invention, in which (a) shows a plane view and (b) shows a side view.

As shown in FIG. 1, a manufacturing apparatus 100 of an electrical rotary machine of this embodiment has a coil segment forming apparatus 1, and a coil assembling section 2 for assembling coil segments formed in the coil segment forming apparatus 1 to insert into corresponding slots circularly arranged along the circumferential direction of the electrical rotary machine. The coil segment forming apparatus 1 has a wire rod providing section 3, a first bending section 4 and a second bending section 5. The first bending section 4 bends a separated linear wire rod with a predetermined length, supplied from the wire rod providing section 3, into a predetermined shape (U shape for example) in the same plane (in a horizontal plane in this embodiment). The second bending section 5 bends a coil segment (first bent body) bent in the first bending section 4 in a plane (in the perpendicular plane in this embodiment) perpendicular to the axis of the coil segment and to the above-mentioned same plane. Also, the second bending section 5 provides a special shape (stepped shape or crank shape) to the top end portion of the coil segment in order to shift or misalign a pair of slot insertion portions of the coil segment in a radial direction of the core. In other words, the second bending section 5 forms a step part with a crank shape at the top end portion of the coil segment.

The wire rod providing section 3 has a bobbin 7 on which a continuous wire rod 6 of a rectangular wire with the surface coated by an insulation layer is wound, a feed direction switching section 8 for drawing the continuous wire rod 6 from the bobbin 7 and for changing its feed direction, a corrective transporting section 9 including a plurality of roller pairs 9a for pinching the flatwise side of the continuous wire rod 6 to transport the pinched wire rod and a plurality of roller pairs 9b for pinching the edgewise side of the continuous wire rod 6 to transport the pinched wire rod, for correcting a longitudinal distortion of the wire rod, a peeling section 10 for stripping the insulation layer coated around the distortion-corrected wire rod 6, in which peeling areas are located at both end portions of the wire rod to keep a predetermined distance with each other, and a cutting section 11 for cutting the continuous wire rod 6 passed through the peeling section 10 at positions located along the wire rod to keep the predetermined distance with each other into separated wire rods. The peeling section 10 in this embodiment has a configuration to strip the coated insulation layer by a laser beam. A peeling area stripped by the peeling section 10 includes respective two areas of the separated wire rod and the neighbor separated wire rod. Thus, the cutting section 11 is constituted to cut the continuous wire rod 6 at the center position of the peeling area. Note that, as for the peeling section 10, any constitution to strip the coated insulation layer using mechanical cutting or clipping may be utilized other than that using the laser beam.

The separated wire rod 6 bent by the first bending section 4, that is, a U-shaped first bent body is transferred to the second bending section 5 by means of a feed mechanism 12 located between the first bending section 4 and the second bending section 5. The feed mechanism 12 has a pair of chucking portions (not shown) formed by air cylinders. The pair of chucking portions will be waiting in the state where their chuck pieces are open to cover the region into which both leg parts (a pair of slot insertion portions) of the first bent body are turned by the bending. After the chucking portions grip the both leg parts of the first bent body, the feed mechanism 12 moves upward to detach the first bent body from the first bending section 4 and then transfers the first bent body to the second bending section 5. The end portions of the both leg parts of the first bent body 17 transferred by means of the feed mechanism 12 are then held by a hold member 13. The hold member 13 is configured as well as the feed mechanism 12 to grip the pair of slot insertion portions by a pair of chucking portions opened and closed by air cylinders. After the first bent body is delivered to the hold member 13, the feed mechanism 12 backs away so that the coil end portion (linking portion) of the first bent body becomes free. Under this state, bending operation including bending operation for forming a curved shape and a step part with a crank shape in the coil end portion of the first bent body is performed by the second bending section 5. In the configuration shown in FIG. 1, the feed direction switching section 8, the corrective transporting section 9, the peeling section 10 and the cutting section 11 in the wire rod providing section 3, and the first bending section 4 are aligned along the lateral direction in FIG. 1 (*a*), the second binding section 5 is arranged along the perpendicular direction with respect to the first bending section 4 (the longitudinal direction in FIG. 1 (*a*)), and the coil assembling section 2 is arranged along the perpendicular direction with respect to the second bending section 5 (the lateral direction in FIG. 1 (*a*)). However, the feed direction switching section 8, the corrective transporting section 9, the peeling section 10, the cutting section 11, the first bending section 4, the second binding section 5 and the coil assembling section 2 may be aligned along the lateral direction in FIG. 1 (*a*). That is, there is no limitation in the arrangement of the coil segment forming section and the coil assembling section, in other words, there is no limitation in the layout if the coil formation concludes in a single manufacturing apparatus.

Hereinafter, configurations of press jigs in the second bending section 5 and bending operations of the first bent body will be described with reference to FIG. 2.

Figure 2:
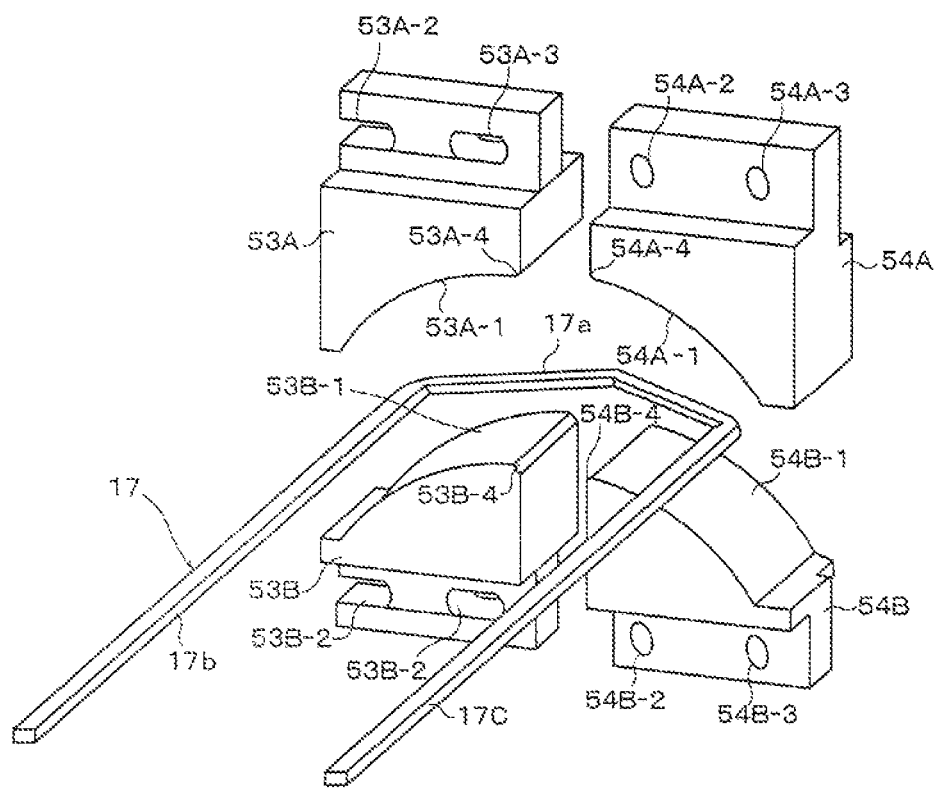
FIG. 2 is an exploded perspective view schematically illustrating a constitution of press jigs in a second bending section of a coil segment forming apparatus in the embodiment of FIG. 1 and a position of a first bent body that is bent by these press jigs.

The second bending section 5 has as shown in FIG. 2 a block-shaped press jig 53A provided with on its lower surface a press surface 53A-1 curved in concave, a block-shaped press jig 53B provided with on its upper surface a press surface 53B-1 curved in convex, which is corresponding to the press surface 53A-1, a block-shaped press jig 54A provided with on its lower surface a press surface 54A-1 curved in concave, and a block-shaped press jig 54B provided with on its upper surface a press surface 54B-1 curved in convex, which is corresponding to the press surface 54A-1. The pair of press jigs 53A and 53B are located to oppose to each other in a direction intersecting with (for example a direction perpendicular to) a plane in which the first bent body 17 is held (the horizontal plane in this embodiment), and moved along the intersecting direction so as to close to each other. The pair of press jigs 54A and 54B are also located to oppose to each other in a direction intersecting with (for example a direction perpendicular to) a plane in which the first bent body 17 is held (the horizontal plane in this embodiment), and also moved along the intersecting direction so as to close to each other. The plane in which the first bent body 17 is held is a plane formed by the bending operation performed in the first bending section 3. That is, the first bent body 17 is transferred to the second bending section 5 by means of the feed mechanism 12 in a posture bent in the first bending section 4 and then bending operation of this first bent body 17 is executed in the second bending section 5 with keeping this posture.

The press jig 53A located in FIG. 2 on the upper left has bolt-insertion holes 53A-2 and 53A-3 for fixing it to a support member as will be mentioned below, also the press jig 54A located in FIG. 2 on the upper right has similarly bolt-insertion holes 54A-2 and 54A-3. The bolt-insertion holes 53A-2 and 53A-3 have an elongated slot shape to adjust the position of the press jig 53A with respect to the press jig 54A, in other words, to absorb an error occurred when a single press surface curved in concave is formed by joining the press jigs 53A and 54A.

The press jig 53B located in FIG. 2 on the lower left has bolt-insertion holes 53B-2 and 53B-3 for fixing it to a support member as will be mentioned below, also the press jig 54B located in FIG. 2 on the lower right has similarly bolt-insertion holes 54B-2 and 54B-3. The bolt-insertion holes 53B-2 and 53B-3 have an elongated slot shape to adjust the position of the press jig 53B with respect to the press jig 54B, in other words, to absorb an error occurred when a single press surface curved in convex is formed by joining the press jigs 53B and 54B.

As aforementioned, the first bent body 17 bent in U-shape in the first bending section 4 consists of the linking portion 17*a* with an angle shape and the slot insertion portions 17*b* and 17*c* coupled to each other through this linking portion 17*a* and elongated in parallel with each other. In the second bending section 5, at first, the linking portion 17*a* of the first bending body 17 is bent in the direction intersecting with (for example a direction perpendicular to) a plane in which the first bent body 17 is held (the horizontal plane in this embodiment) to form a curved shape. More concretely, the press jigs 53A and 54A are controlled to be positioned based on the control data of the coil segment to be formed, namely the press jigs 53A and 54A are driven to move into an adjacent state in proximity to each other so that their press surfaces 53A-1 and 54A-1 form a single surface curved in concave. Also, the press jigs 53B and 54B are controlled to be positioned based on the control data of the coil segment to be formed, namely the press jigs 53B and 54B are driven to move into an adjacent state in proximity to each other so that their press surfaces 53B-1 and 54B-1 form a single surface curved in convex.

Since both pairs of or one pair of the press jigs 53A and 54A and the press jigs 53B and 54B in this state are moved in the upper and lower directions in a plane (the vertical plane) perpendicular to a plane of the first bent body 17 (the horizontal plane), the linking portion 17*a* of the first bent body 17 is pressed to form the curved shape. Corner edges 53A-4, 53B-4, 54A-4 and 54B-4 of the respective press jigs 53A, 53B, 54A and 54B that will be in contact with the surface of the linking portion 17*a* during this pressing operation are chamfered respectively so as to not hurt the insulating layer of the linking portion 17*a*.

Because the press jigs 53A and 54A are not configured as an integral block but configured as blocks divided with each other, it is possible to continuously perform the bending operation process of forming the curve-shaped linking portion 17*a* and the bending operation process of forming a crank-shaped step part at the tip of the linking portion 17*a* in this second bending section 5. That is, two kinds of bending operation processes consisting of the curved shape bending process and the crank-shaped step part forming process in the plane (the vertical plane) perpendicular to the plane of the first bent body 17 (the horizontal plane) can be performed without changing the forming die (press jigs). This is similar about the press jigs 53B and 54B. Also, control conditions in two kinds of the bending operation processes can be changed by modifying the moving distances of these press jigs 53A, 53B, 54A and 54B, respectively, and thereby it is possible to form various kinds of coil segments by using the same press jigs.

Figure 3:
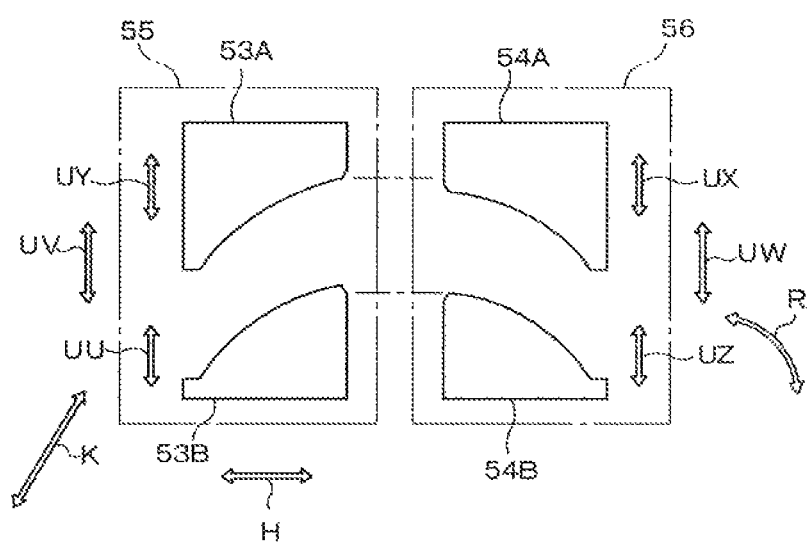
FIG. 3 is views illustrating moving directions of the respective press jigs in the second bending section in the embodiment of FIG. 1.

FIG. 3 shows moving directions of the press jigs of the second bending section 5. As shown in the figure, a thickness in the upper and lower directions of the central axis side (the inner side) of the press jig 54A is set larger than a thickness in the upper and lower directions of the central axis side (the inner side) of the press 53A, and a thickness in the upper and lower directions of the central axis side (the inner side) of the press jig 53B is set larger than a thickness in the upper and lower directions of the central axis side (the inner side) of the press 54B. These press jigs 53A, 54A, 53B and 54B are individually movable by the drive mechanisms described later in the upper and lower directions (UY directions, UX directions, UU directions and UZ directions) in the vertical plane. By appropriately controlling the moving directions and the moving speed of these press jigs 53A, 54A, 53B and 54B, the press jigs 53A and 53B can be moved in the upper and lower directions (the UV directions) as a single press jig unit 55, and similarly the press jigs 54A and 54B can be moved in the upper and lower directions (the UW directions) as a single press jig unit 56. The press jig unit 55 can be moved in a horizontal direction (the H direction), and therefore this press jig unit 55 can be moved in an oblique direction (the K direction) by simultaneously performing the movement in the upper and lower directions and the movement in the horizontal direction. The press jig unit 56 can perform not only the movement in the upper and lower directions (the UW directions) but also the rotation (turn) in R direction in the vertical plane. This rotation of the press jig unit 56 enables variable adjustment of a curvature factor of the curved surface of the linking portion 17a of the first bent body 17 when forming the curved surface or the curved shape, and also enables formation of the curved surfaces in the linking portions 17a of the first bent bodies 17 even if the width between the slot insertion portions 17b and 17c of theses first bent bodies 17 differ with each other. That is, according to such configurations of the press jig units, the second bending of the coil segments with various kinds of shapes is enabled. The movement of the upper and lower directions of each of the press jigs 53A, 53B, 54A and 54B, the movement in the horizontal direction and the oblique directions of the press jig unit 55, and the movement of the rotation of the press jig unit 56 are numerically controlled (NC controlled) based on the set moving amount data (control data), respectively. It should be noted that, in FIGS. 3, 4 and 5, fixing parts of the press jigs 53A, 53B, 54A and 54B to the support member are omitted from illustration.

Hereinafter, referring to FIG. 4, the bending operations in the second bending section 5 will be schematically described. In this drawing, as the first bent body 17, only the linking portion 17a that is the processing object is shown by hatching.

Figure 4:
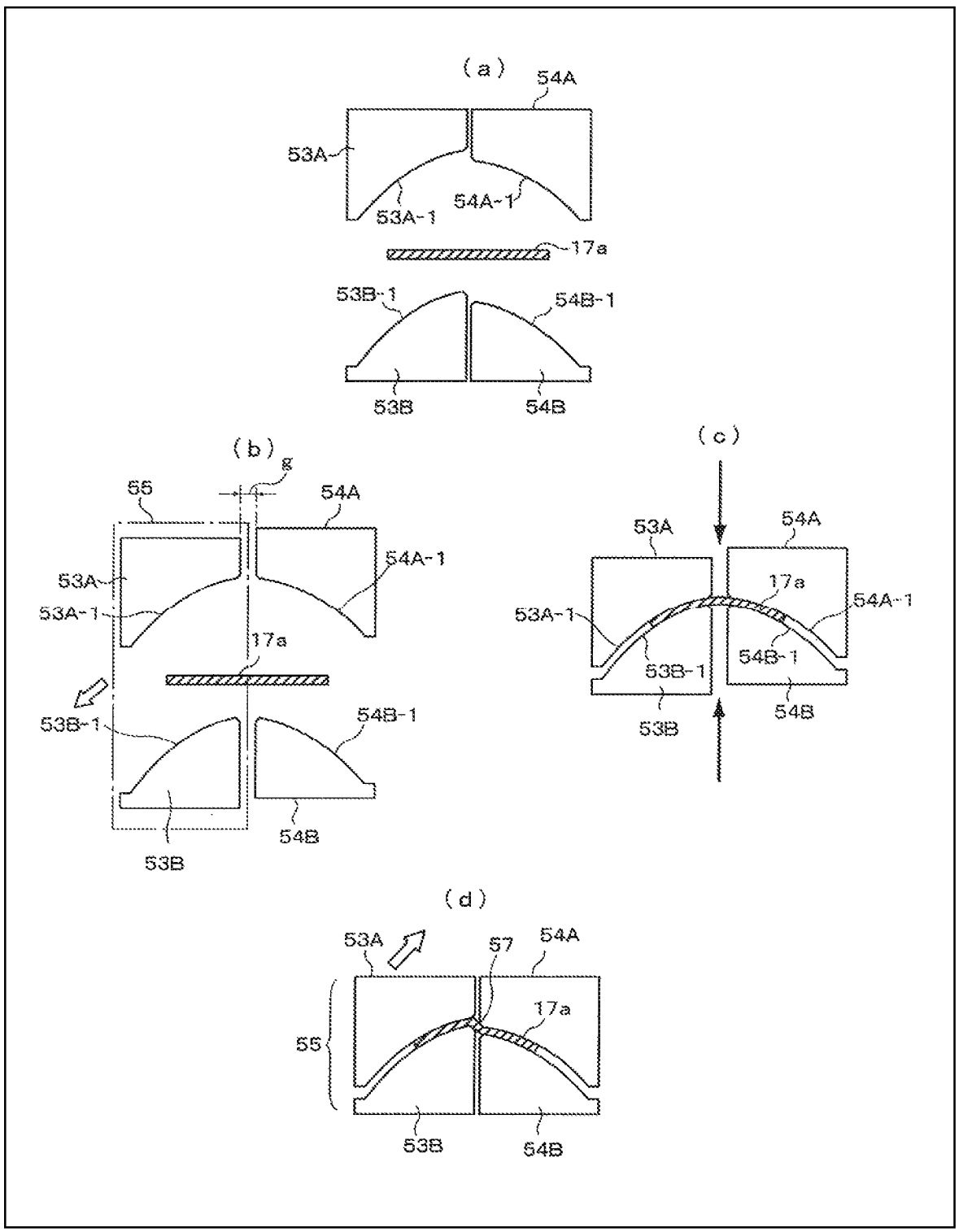
FIG. 4 is views illustrating curved shape bending processes (curved shape forming processes) and stepped shape creating processes (crank-shaped step part forming processes) of a linking portion in the second bending section in the embodiment of FIG. 1.

FIG. 4 (a) shows the conditions where the press jigs 53A, 53B, 54A and 54B are in initial position (home position). That is, this drawing shows an initial state where the first bent body 17 bent by the first bending section 4 was transferred to the second bending section 5 by the feed mechanism 12 and the free end portions of the pair of slot insertion portions 17b and 17c of the first bent body 17 were held by the hold member 13, and then the feed mechanism 13 was backed away from the first bent body 17 so that bending operations of this first bent body 17 in the second bending section 5 can be started. In this home position, the adjacent press jigs 53A and 54A in proximity to each other are positioned so that their upper end surfaces form the same plane and the adjacent press jigs 53B and 54B in proximity to each other are positioned so that their lower end surfaces form the same plane. In this position, also, the press surfaces 53A-1 and 54A-1 of the press jigs 53A and 54A have a step between them, and the press surfaces 53B-1 and 54B-1 of the press jigs 53B and 54B have a step between them.

From the home position, as shown in FIG. 4 (b), the press jig unit 55 consisting of the press jigs 53A and 53B is integrally moved to the left oblique lower direction. Thus, a gap g is formed between the press jig 53A and the press jig 54A and also the press surfaces 53A-1 and 54A-1 of the press jigs 53A and 54A form a curved concave smooth surface with no step there between. In addition, the press surfaces 53B-1 and 54B-1 of the press jigs 53B and 54B forma curved concave smooth surface with no step there between.

From this state, a press operation is started. Namely, at first, the pair of press jigs 53B and 54B are moved upward to abut to the lower surface of the linking portion 17a, and then the pair of the press jigs 53A and 54A are moved downward with keeping the state of the pair of press jigs 53B and 54B as shown in FIG. 4 (c). In other words, the linking portion 17a is pinched between the curved concave surface formed by the press surfaces 53A-1 and 54A-1 of the press jigs 53A and 54A and the curved convex surface formed by the press surfaces 53B-1 and 54B-1 of the press jigs 53B and 54B and pressed by these curved concave surface and curved convex surface so as to bend or curve the linking portion 17a in a direction perpendicular to the horizontal plane of the linking portion 17a. When the press operation is performed in some extent, namely when no position deviation of the first bent body 17 may be occurred, holding or chucking of the first bent body 17 by the hold member 13 (chucking of the air cylinders) is cancelled. It should be noted that the movements of the press jigs during this press operation are not limited to the above-mentioned movement but various kinds of movements may be adopted as far as no position deviation of the first bent body 17 occurs. When the above-mentioned press operation is completed, the process of forming the curved shape in the linking portion 17a that is bending process of the linking portion 17a is finished.

After the process of forming the curved shape in the linking portion 17a is finished, while the linking portion 17a is pinched between the press surfaces 53A-1 and 54A-1 of the press jigs 53A and 54A and the press surfaces 53B-1 and 54B-1 of the press jigs 53B and 54B, the press jig unit 55 consisting of the press jigs 53A and 53B is moved to the right oblique upper direction as shown in FIG. 4 (d) so that the upper end surfaces of the press jigs 53A and 54A become the same plane and the lower end surfaces of the press jigs 53B and 54B become the same plane. A step part 57 with a crank shape is thereby formed on the top of linking portion 17a. The gap g formed by the movement of the press jig unit 55 in the left oblique lower direction shown in FIG. 4 (b) was made for formation of the curved shape of the linking portion 17a and formation of the step part with the crank shape on the linking portion 17a.

In case that a press die with the fixed shape in its press surface was used as in the conventional art, it was possible to form the curved shape and the step part with the crank shape on the linking portion 17a by one press operation at the same time. However, in the conventional forming method where the press dies had the respective fixed curved shapes and the respective fixed step shapes, it was necessary to exchange the press die each time the bending operation for forming different shapes was executed. Also, in the conventional forming method, the press die might execute an unreasonable bending of the wire rod. For example, the press die might apply unnecessary stress to the both surfaces of the wire rod or to the whole surface of the wire rod, and therefore the insulation layer of the wire rod might be injured. In other words, since an excess stress might be concentrated at a sharp edge of the press surface of the press die to increase bending precision, the insulation layer might be easily damaged. Also, in the method using the press die with the fixed shape, it was unknowable whether the insulation layer of the wire rod was damaged or not until the wire rod was really pressed by the press die. If damaged, it was necessary to remake the press die causing the manufacturing cost of the coil segment to increase. In contrast, according to this embodiment, forming of the curved shape and forming of the crank-shaped step part are separately performed by the plurality of bending (shaping) processes, and each bending process (shaping process) is simplified and realized by the movement of the press jigs. Thus, the problems by using the press dies can be solved, and it is possible to quickly perform the transformation from the forming process of the curved shape to the forming process of the crank-shaped step part by changing the moving amount of the press jigs. The forming time of the curved shape and the crank-shaped step part in this embodiment is substantially the same as that in the conventional method where forming is done by one press operation using the press die with fixed shape. Further, according to this embodiment, in the bending process for forming the curved shape, since the linking portion of the wire rod is pinched between the curved smooth surfaces and then pressed, the insulation layer of the wire rod is never injured. Also, in the forming process of the crank-shaped step part, since no press surface with the step shape is pressed to the linking portion but the position of the pair of press jigs that pinch the linking portion are merely moved, the insulation layer of the wire rod is never injured as well.

Figure 5:
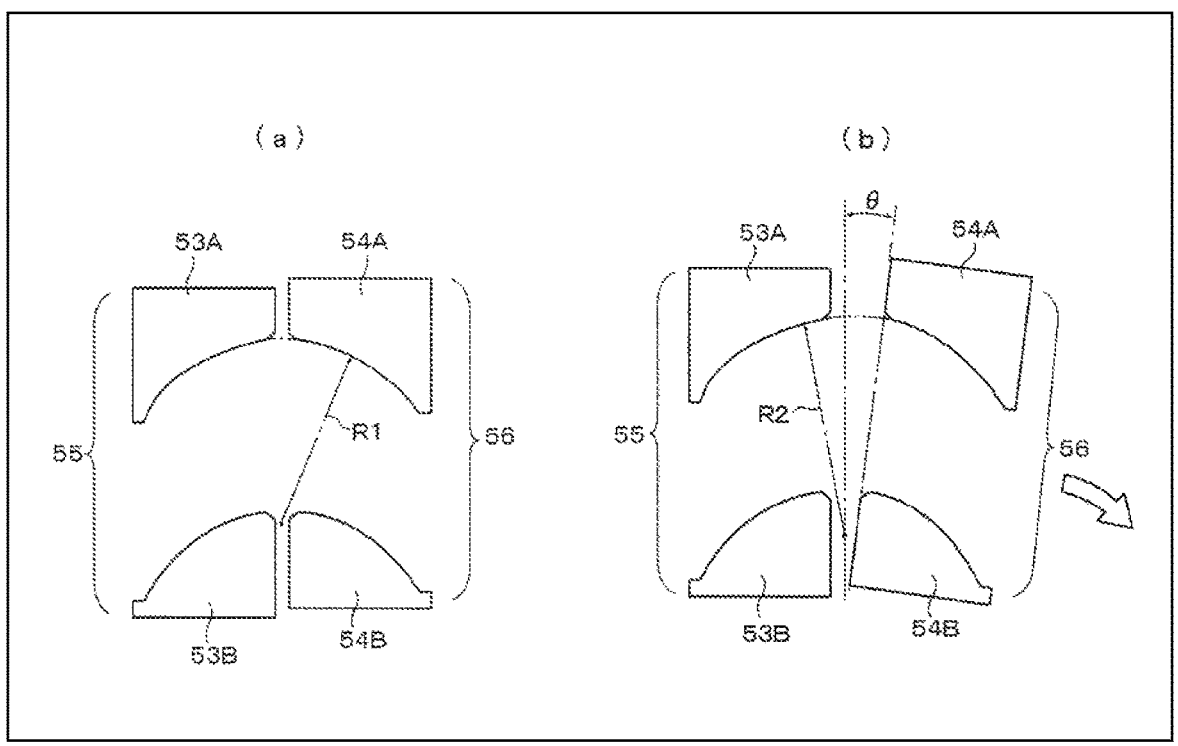
FIG. 5 is views illustrating curvature-factor adjustment operations in the second bending section in the embodiment of FIG. 1.

Referring now to FIG. 5, curvature-factor adjustment operations of the curved shape in the bending of the curved shape forming process will be described. FIG. 5 (a) shows an initial state before starting the curvature-factor adjustment operations. This state is equivalent to the state shown in FIG. 4 (c), and the curvature radius is R1. When the press jig unit 56 shown in right side in the figure is rotated by an angle θ around the center of the curvature C, the curvature radius changes from R1 to R2 (R1<R2) as shown in FIG. 5 (b) to decrease the curvature factor as 1/R2. That is, by rotating the press jig unit 56, the curvature factor of the curved shape of the linking portion 17a can be changed and therefore bending operations of various kinds of coil segments with different curvature factors of the curved shape in the linking portion 17a can be performed. In addition, with respect to the first bent bodies 17 with different widths between the slot insertion portions 17b and 17c, bending operations of the linking portion 17a can be performed by adjusting the curvature factor of the curved shape.

Hereinafter, configurations of drive mechanism and else of the second bending section 5 will be described in detail with reference to FIGS. 6 and 7.

Figure 6:
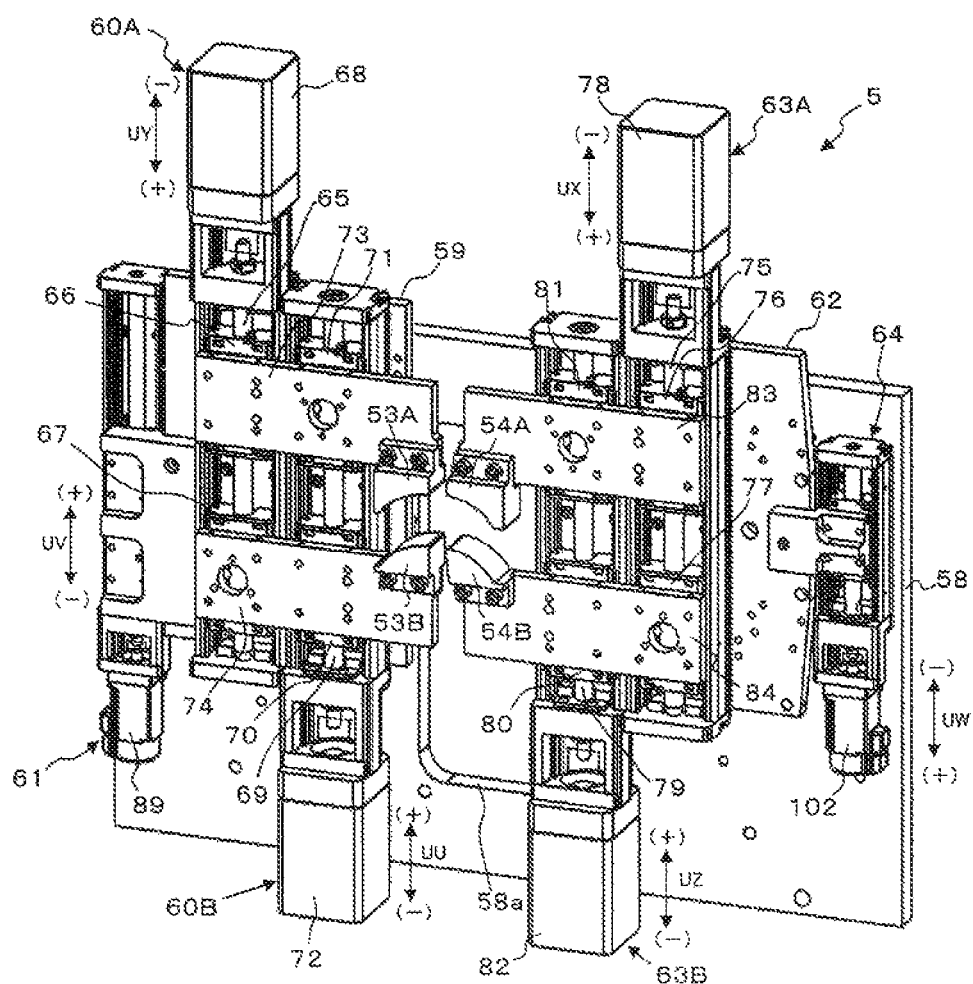
FIG. 6 is a perspective view schematically illustrating a whole constitution including a drive mechanism in the second bending section in the embodiment of FIG. 1.
Figure 7:
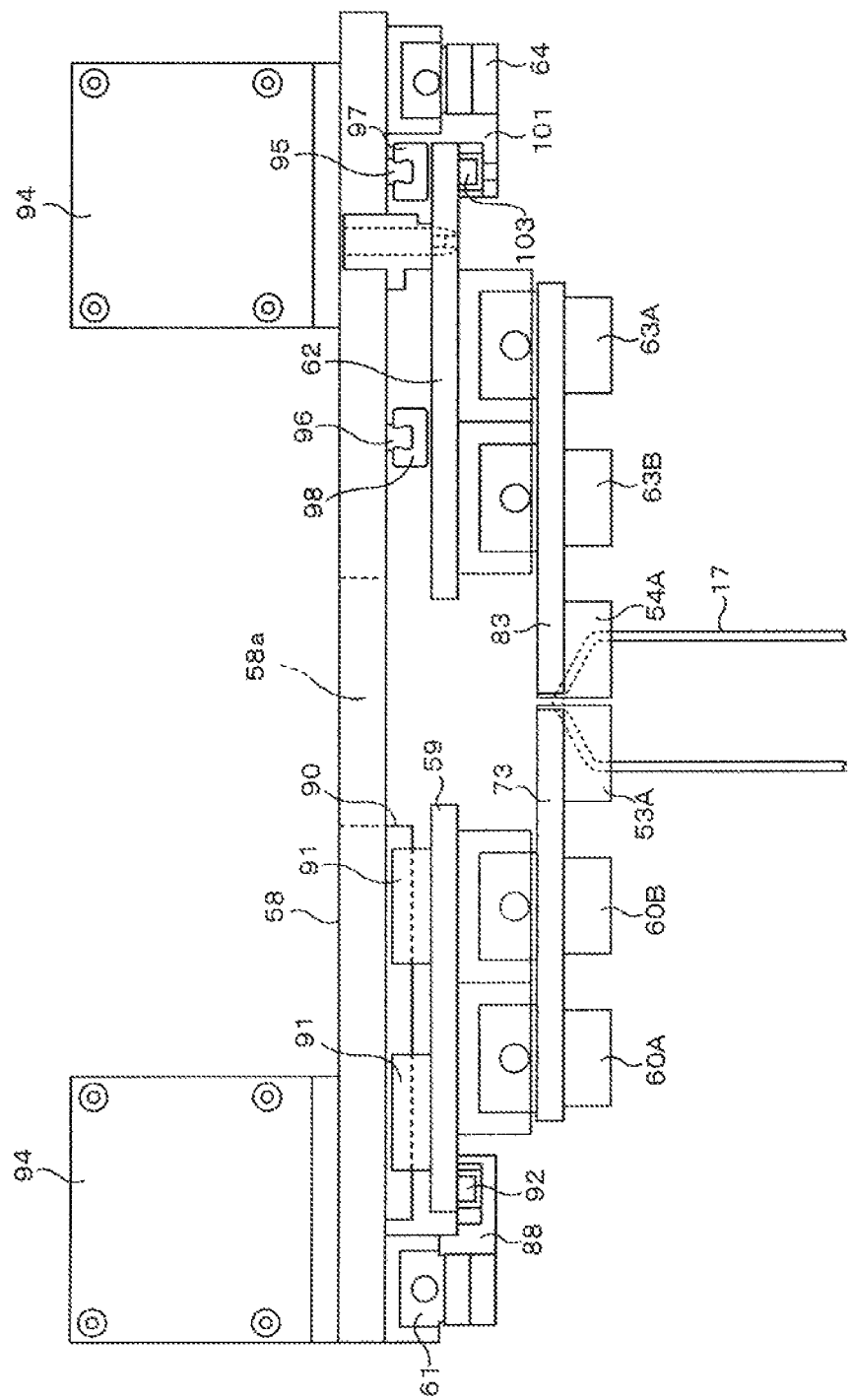
FIG. 7 is a plane view schematically illustrating the whole constitution including the drive mechanism in the second bending section in the embodiment of FIG. 1.

As shown in FIGS. 6 and 7, the second bending section 5 has a fixed base 58 provided with an opening portion 58a at its center part and arranged in parallel to the vertical plane (the plane perpendicular to the horizontal plane that supports the first bent body 17), a movable base 59 movable in the right and left directions in the plane that is parallel to the fixed base 58, a drive mechanism 60A fixed to the movable base 59 for moving the press jig 53A in the upper and lower directions (the UY directions), a drive mechanism 60B fixed to the movable base 59 for moving the press jig 53B in the upper and lower directions (the UU directions), a drive mechanism 61 fixed to the fixed base 58 for moving the movable base 59 in the right and left directions (the UV directions), a rotation base 62 coupled with the fixed base 58 and capable of rotating around the center of the curvature C in the vertical plane, a drive mechanism 63A fixed to the rotation base 62 for moving the press jig 54A in the upper and lower directions (the UX directions), a drive mechanism 63B fixed to the rotation base 62 for moving the press jig 54B in the upper and lower directions (the UZ directions), and a drive mechanism 64 coupled with the rotation base 62 for moving the rotation base 62 in the upper and lower directions (the UW directions) and for rotating the rotation base 62 around the center of the curvature C. Note that, as shown in FIG. 7, the fixed base 58 is supported perpendicularly by two brackets 94 with L-shape that are fixed respectively to the both side portions in the longer distance (left and right directions).

The drive mechanism 60A has a ball screw portion 65 provided with a rotation axis that is parallel to the upper and lower directions (the UY directions), a nut portion 66 meshed with this ball screw portion 65 and slidable in the UY directions, a slider 67 not meshed with the ball screw portion 65 but merely slidable along the rotation axis in the UY directions, and a servomotor 68 for rotary driving the ball screw portion 65.

The drive mechanism 60B has a ball screw portion 69 provided with a rotation axis that is parallel to the upper and lower directions (the UU directions), a nut portion 70 meshed with this ball screw portion 69 and slidable in the UU directions, a slider 71 not meshed with the ball screw portion 69 but merely slidable along the rotation axis in the UU directions, and a servomotor 72 for rotary driving the ball screw portion 69.

A movement plate 73 for supporting the press jig is fixed to the nut portion 66 of the drive mechanism 60A and the slider 71 of the drive mechanism 60B, and the press jig 53A is fixed by bolt screws to a right lower portion of the movement plate 73. Thus, it is possible to move only the press jig 53A in the UY directions by the operation of the servomotor 68 of the drive mechanism 60A. Also, a movement plate 74 for supporting the press jig is fixed to the slider 67 of the drive mechanism 60A and the nut portion 70 of the drive mechanism 60B, and the press jig 53B is fixed by bolt screws to a right upper portion of the movement plate 74. Thus, it is possible to move only the press jig 53B in the UU directions by the operation of the servomotor 72 of the drive mechanism 60B. The movement plates 73 and 74 are supported over the drive mechanisms 60A and 60B to obtain stiffness and stability for securing and maintaining the precision of the press operations of the press jigs 53A and 53B.

The drive mechanism 63A has a ball screw portion 75 provided with a rotation axis that is parallel to the upper and lower directions (the UX directions), a nut portion 76 meshed with this ball screw portion 75 and slidable in the UX directions, a slider 77 not meshed with the ball screw portion 75 but merely slidable along the rotation axis in the UX directions, and a servomotor 78 for rotary driving the ball screw portion 75.

The drive mechanism 63B has a ball screw portion 79 provided with a rotation axis that is parallel to the upper and lower directions (the UZ directions), a nut portion 80 meshed with this ball screw portion 79 and slidable in the UZ directions, a slider 81 not meshed with the ball screw portion 79 but merely slidable along the rotation axis in the UZ directions, and a servomotor 82 for rotary driving the ball screw portion 79.

A movement plate 83 for supporting the press jig is fixed to the nut portion 76 of the drive mechanism 63A and the slider 81 of the drive mechanism 63B, and the press jig 54A is fixed by bolt screws to a left lower portion of the movement plate 83. Thus, it is possible to move only the press jig 54A in the UX directions by the operation of the servomotor 78 of the drive mechanism 63A. Also, a movement plate 84 for supporting the press jig is fixed to the slider 77 of the drive mechanism 63A and the nut portion 80 of the drive mechanism 63B, and the press jig 54B is fixed by bolt screws to a left upper portion of the movement plate 84. Thus, it is possible to move only the press jig 54B in the UZ directions by the operation of the servomotor 82 of the drive mechanism 63B. The movement plates 83 and 84 are supported over the drive mechanisms 63A and 63B to obtain stiffness and stability for securing and maintaining the precision of the press operations of the press jigs 54A and 54B.

Figure 8:
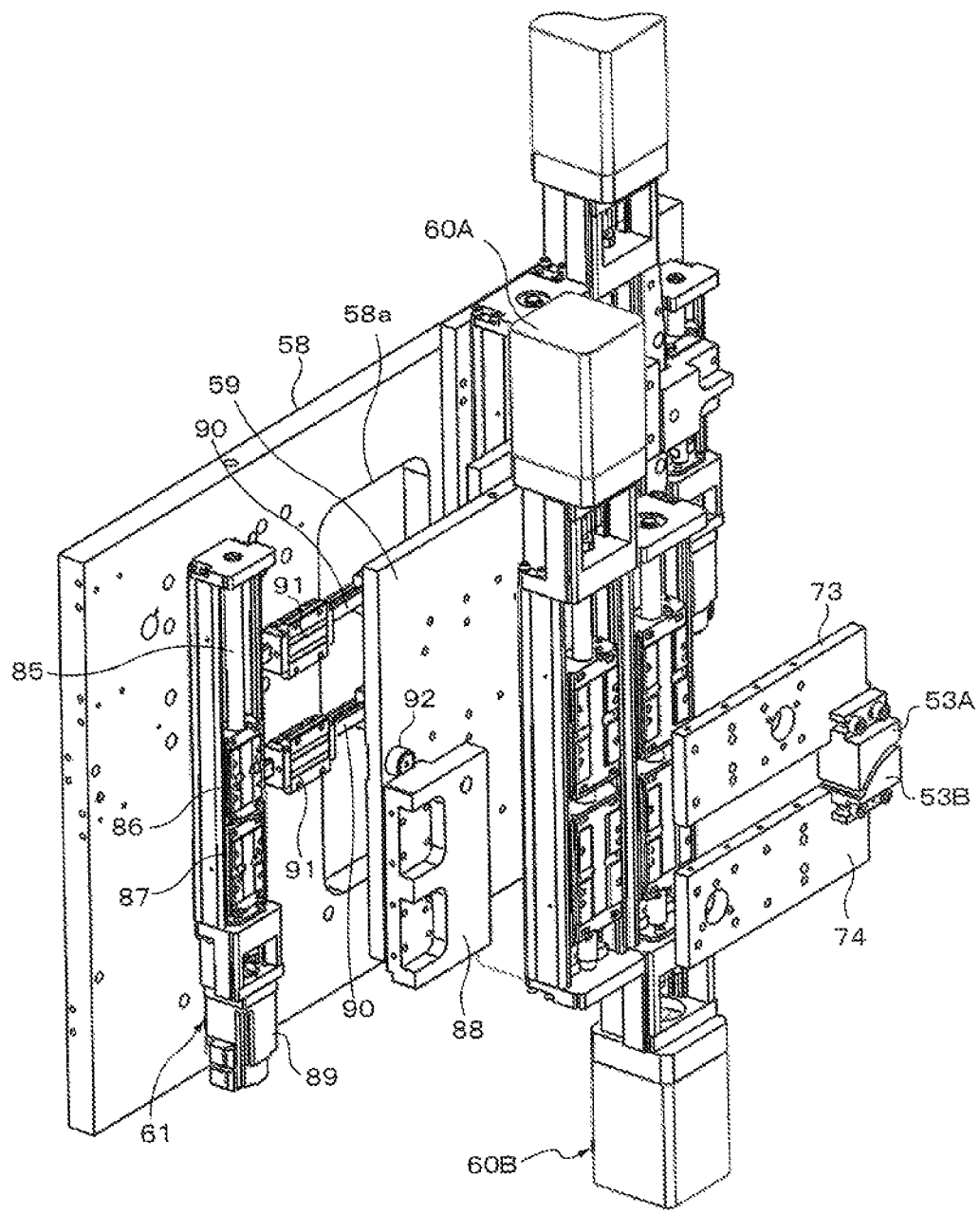
FIG. 8 is an exploded perspective view illustrating a constitution of one side (left half seen from the front) including the drive mechanism in the second bending section in the embodiment of FIG. 1.
Figure 9:
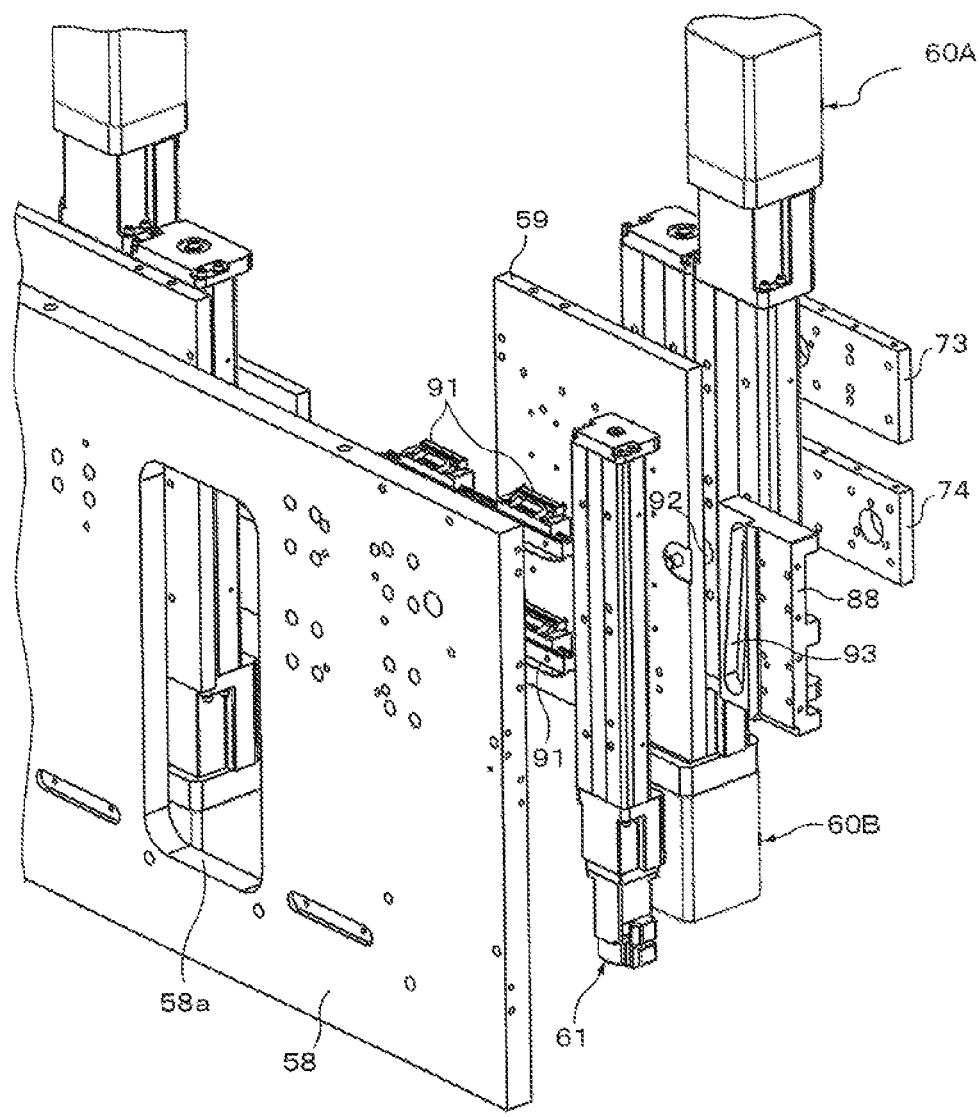
FIG. 9 is an exploded perspective view seen from the rear side illustrating a constitution of the side shown in FIG. 8 in the second bending section in the embodiment of FIG. 1.
Figure 10:
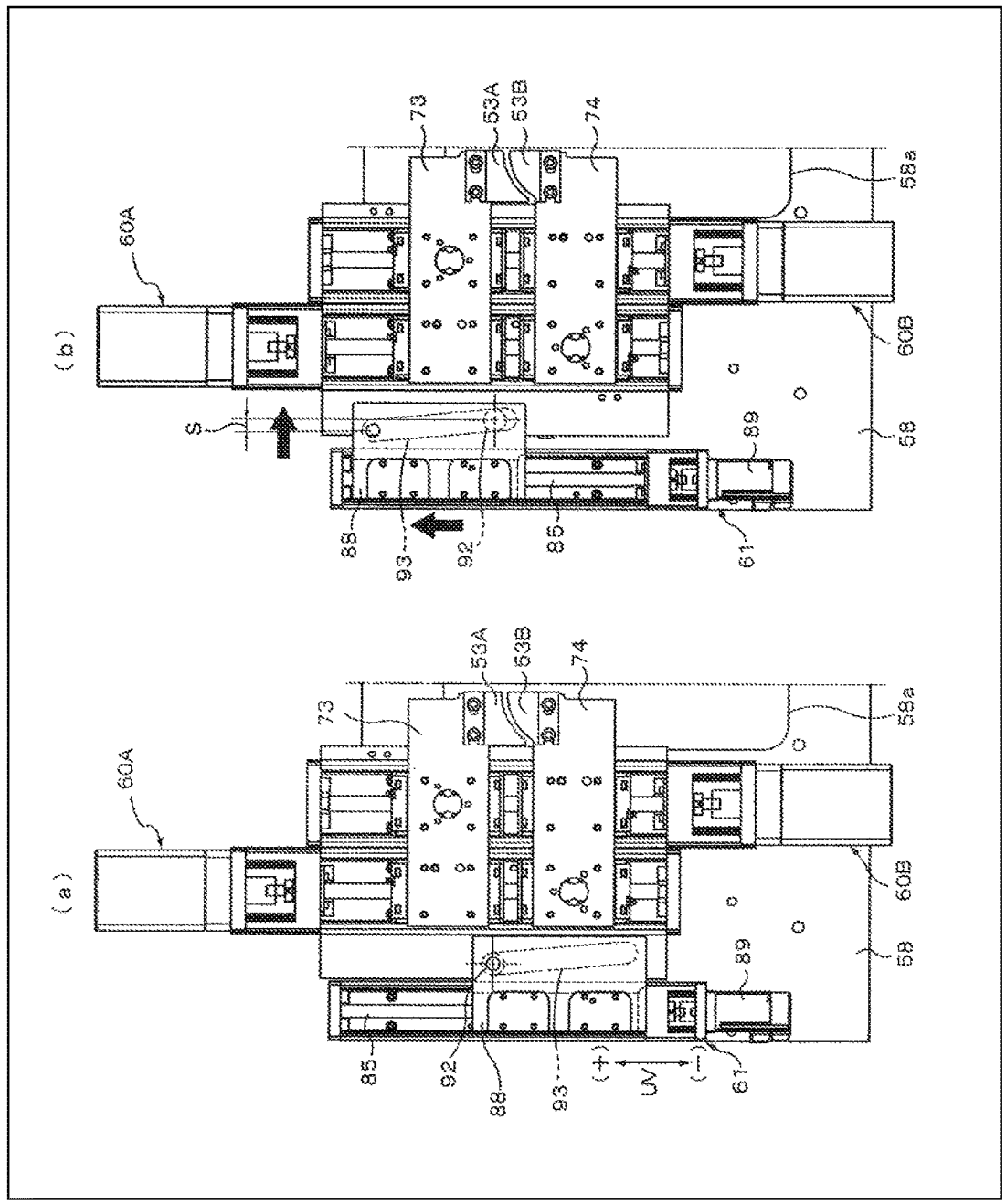
FIG. 10 is a front view illustrating operations of the drive mechanism in the side shown in FIG. 8 in the second bending section in the embodiment of FIG. 1.

Referring next to FIGS. 6, 8, 9 and 10, a constitution of movement to the left and right directions with respect to the movable base 59 for supporting the drive mechanisms 60A and 60B and a constitution of the drive mechanism 61 for moving the movable base 59 will be described. It should be noted that FIG. 8 shows a constitution of one side (left half seen from the front) of the second bending section 5 and a constitution around the drive mechanism 61 in the exploded form, FIG. 9 shows a constitution of this part seen from the rear side in the exploded form, and FIG. 10 shows operations of this part.

As shown in FIGS. 6, 8 and 9, the drive mechanism 61 fixed to the fixed base 58 has a ball screw portion 85 provided with a rotation axis that is parallel to the upper and lower directions (the UV directions), nut portions 86 and 87 meshed with this ball screw portion 85 and slidable in the UV directions, a slide plate 88 fixed to the nut portions 86 and 87 and slidable in the UV directions, and a servomotor 89 for rotary driving the ball screw portion 85. A pair of rail members 90 along the left and right directions are fixed to the fixed base 58 as in upper and lower two lines that are parallel to each other. Two pairs of slide members 91 are fixed to the rear surface of the movable base 59. Each pair of the slide members 91 engages with each rail member 90 so as to be slidable along the rail member 90. The movable base 59 is therefore supported movably in the left and right directions (the horizontal directions) perpendicular to the UV directions (see FIG. 6).

As shown in FIG. 9, the movable base 59 has a cam follower 92 projecting from its surface, and an engagement groove 93 formed on the rear surface of the slide plate 88 at a slant to the UV directions. The cam follower 92 is configured to engage with and slide along the engagement groove 93. In the state shown in FIG. 4 (c), the cam follower 92 engaged with the engagement groove 93 is positioned as shown in FIG. 10 (a). When the servomotor 89 of the drive mechanism 61 operates and thus the slide plate 88 rises to the UV (+) direction, the engagement groove 93 rises with the slide plate 88. The cam follower 92 sliding in the engagement groove 93 will be thereby guided to the right direction in the figure as shown in FIG. 10 (b). As a result, the movable base 59, to which the cam follower 92 is fixed, moves in the right direction by a distance S shown in FIG. 10 (b). If the servomotor 89 is driven in the reversed direction, the movable base 59 moves to the opposite direction. The moving amount in the left and right directions of the movable base 59 can be changed by modifying an inclination angle and/or a length of the engagement groove 93. The crank shape or the step part shape of the linking portion 17a, or the curvature factor of the curved surface of the linking portion 17a can be changed by modifying the moving amount in the left and right direction of the movable base 59.

As aforementioned, since the press jig unit 55 consisting of the press jigs 53A and 53B is movable in the upper and lower directions by means of the drive mechanisms 60A and 60B, this press jig unit 55 can be moved in an oblique direction by combining and simultaneously performing the movement in the left and right directions by the drive mechanism 61 and the movement in the upper and lower directions by the drive mechanisms 60A and 60B. For example, the oblique direction movement from the home position state shown in FIG. 4 (a) to the state shown in FIG. 4 (b) can be attained by simultaneously moving the movable base 59 to the left direction by means of the drive mechanism 61 and the movement plates 73 and 74 to the lower direction by means of the drive mechanisms 60A and 60B. Also, the oblique direction movement from the state shown in FIG. 4 (c) to the state shown in FIG. 4 (d) can be attained by simultaneously moving the movable base 59 to the right direction by means of the drive mechanism 61 and the movement plates 73 and 74 to the upper direction by means of the drive mechanisms 60A and 60B.

Figure 11:
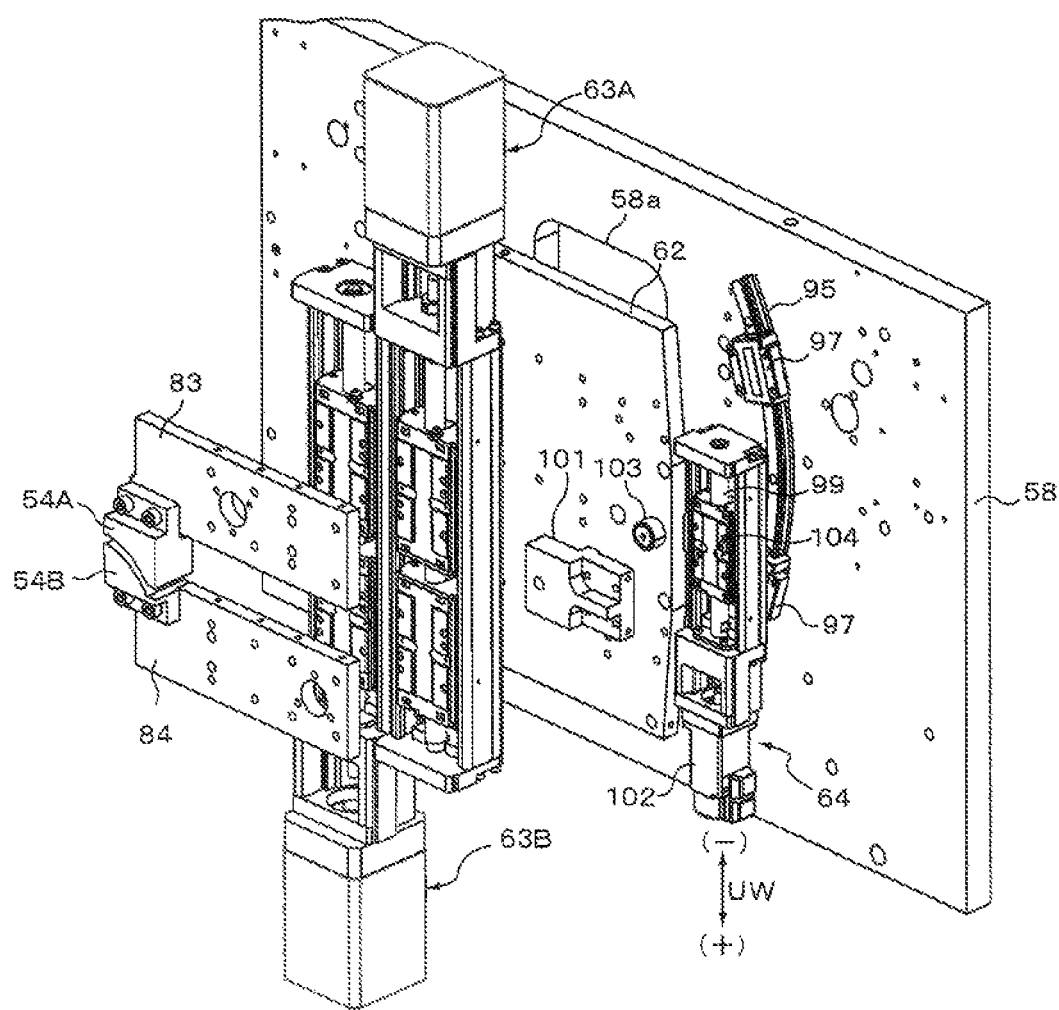
FIG. 11 is an exploded perspective view illustrating a constitution of the other side (right half seen from the front) including the drive mechanism in the second bending section in the embodiment of FIG. 1.
Figure 12:
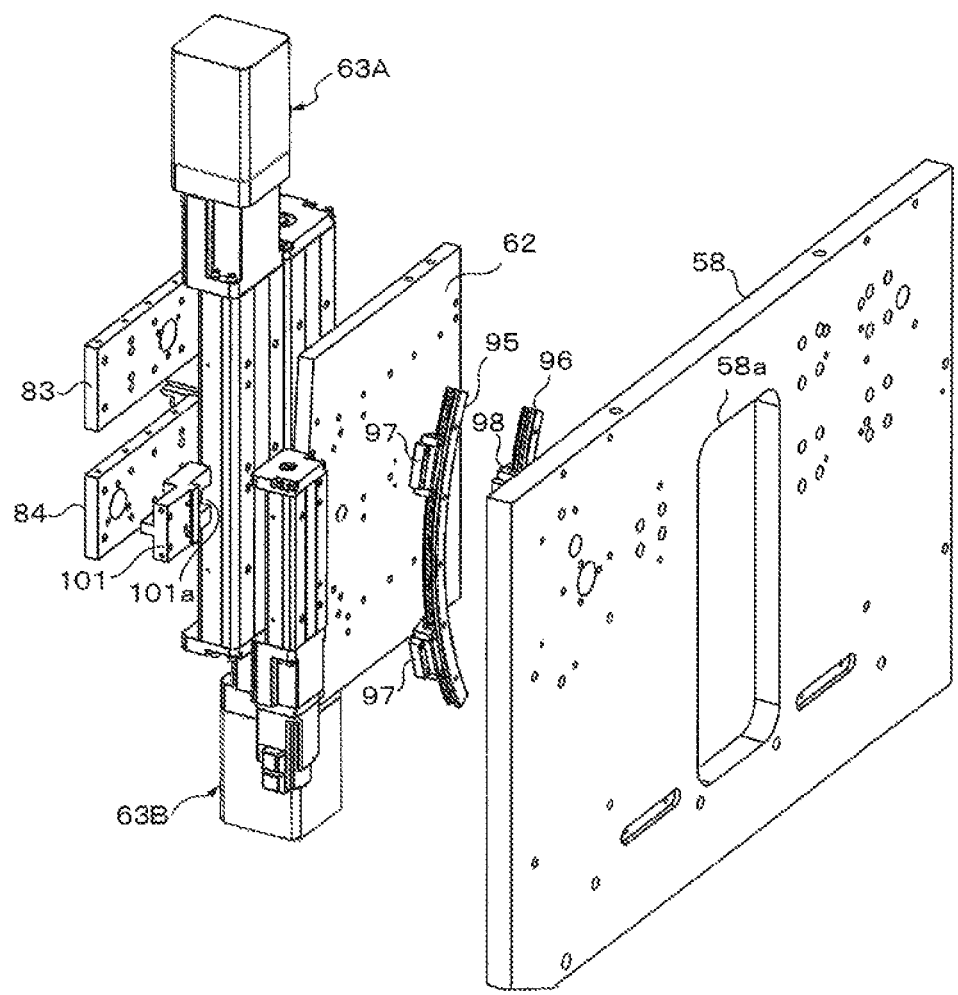
FIG. 12 is an exploded perspective view seen from the rear side illustrating a constitution of the side shown in FIG. 11 in the second bending section in the embodiment of FIG. 1.
Figure 13:
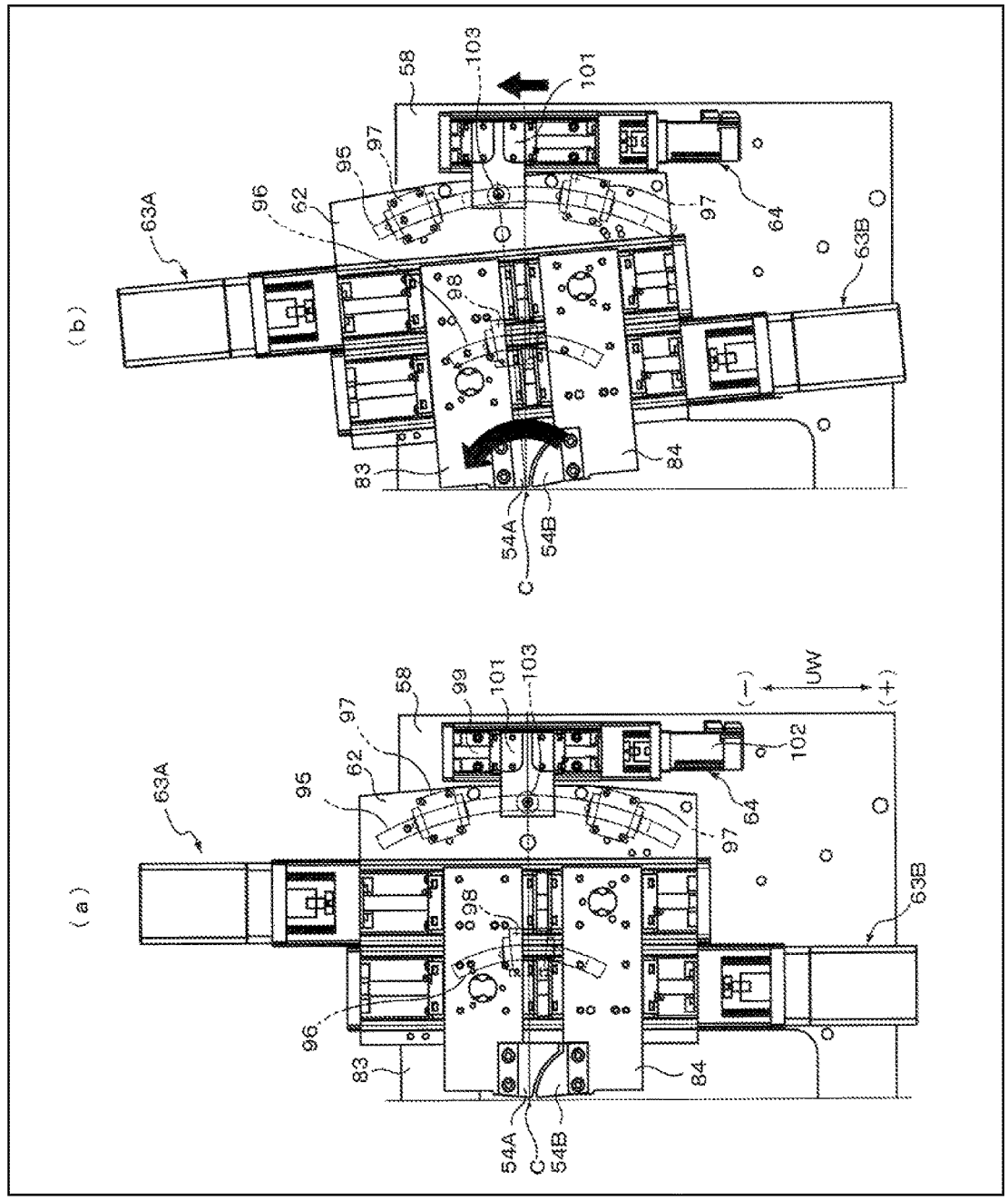
FIG. 13 is a front view illustrating operations of the drive mechanism in the side shown in FIG. 11 in the second bending section in the embodiment of FIG. 1.

Referring next to FIGS. 11, 12 and 13, a constitution of rotating movement with respect to the rotation base 62 for supporting the drive mechanisms 63A and 63B and a constitution of the drive mechanism 64 for rotating the rotation base 62 will be described. It should be noted that FIG. 11 shows a constitution of one side (right half seen from the front) of the second bending section 5 and a constitution around the drive mechanism 64 in the exploded form, FIG. 12 shows a constitution of this part seen from the rear side in the exploded form, and FIG. 13 shows operations of this part.

As shown in FIGS. 12 and 13, a pair of rail members 95 and 96 having the common center of curvature C and curved shapes with different curvature factors are fixed to the fixed base 58 so that the rail members are isolated with each other in the left and right directions, and a pair of slide members 97 and a single slide member 98 are fixed to the rear surface of the rotation base 62. The pair of slide members 97 engage with the rail member 95 so that the slide members 97 can slide along the rail member 95, and the single slide member 98 engages with the rail member 96 so that the slide member 98 can slide along the rail member 96. The drive mechanism 64 has a ball screw portion 99 provided with a rotation axis that is parallel to the upper and lower directions (UW directions), a nut portion 100 meshed with this ball screw portion 99 and slidable in the UW direction, an engagement member 101 fixed to the nut portion 100, and a servomotor 102 for rotary driving the ball screw portion 99. The rotation base 62 has a cam follower 103 projecting from its surface, and an engagement groove 101a (see FIG. 12) engaged with the cam follower 103 is formed on the rear surface of the engagement member 101.

When the servomotor 102 of the drive mechanism 64 operates to move the engagement member 101 to the UW (−) direction, the cam follower 103 engaging with the engagement groove 101a moves so that the slide members 97 and 98 slide along the rail members 95 and 96, and the rotation base 62 rotates around center of curvature C in the counterclockwise direction. That is, the rotation base 62 rotates from the state shown in FIG. 13 (a) (stayed in the center) to the state shown in FIG. 13 (b). Because the press jigs 54A and 54B are fixed to this rotation member 62, the press jig unit 56 having these press jigs 54A and 54B integrated there with rotates. When the rotation base 62 rotates in the counterclockwise direction as aforementioned, the curvature factor at the time of forming of the curved shape to the linking portion 17a using the press jigs 53A, 53B, 54A and 54B will be kept large. On the contrary, when the rotation base 62 rotates in the clockwise direction from the center position shown in FIG. 13 (a), the curvature factor at the time of forming of the curved shape to the linking portion 17a can be lowered. The curvature center C that is the center of the rotation of the rotation base 62 stably guided by the pair of rail member 95 and 96 is located near the left end edge of the press jigs 54A and 54B, and thereby it is possible to change the curvature factor at the time of forming of the curved shape with a high degree of accuracy.

Figure 14:
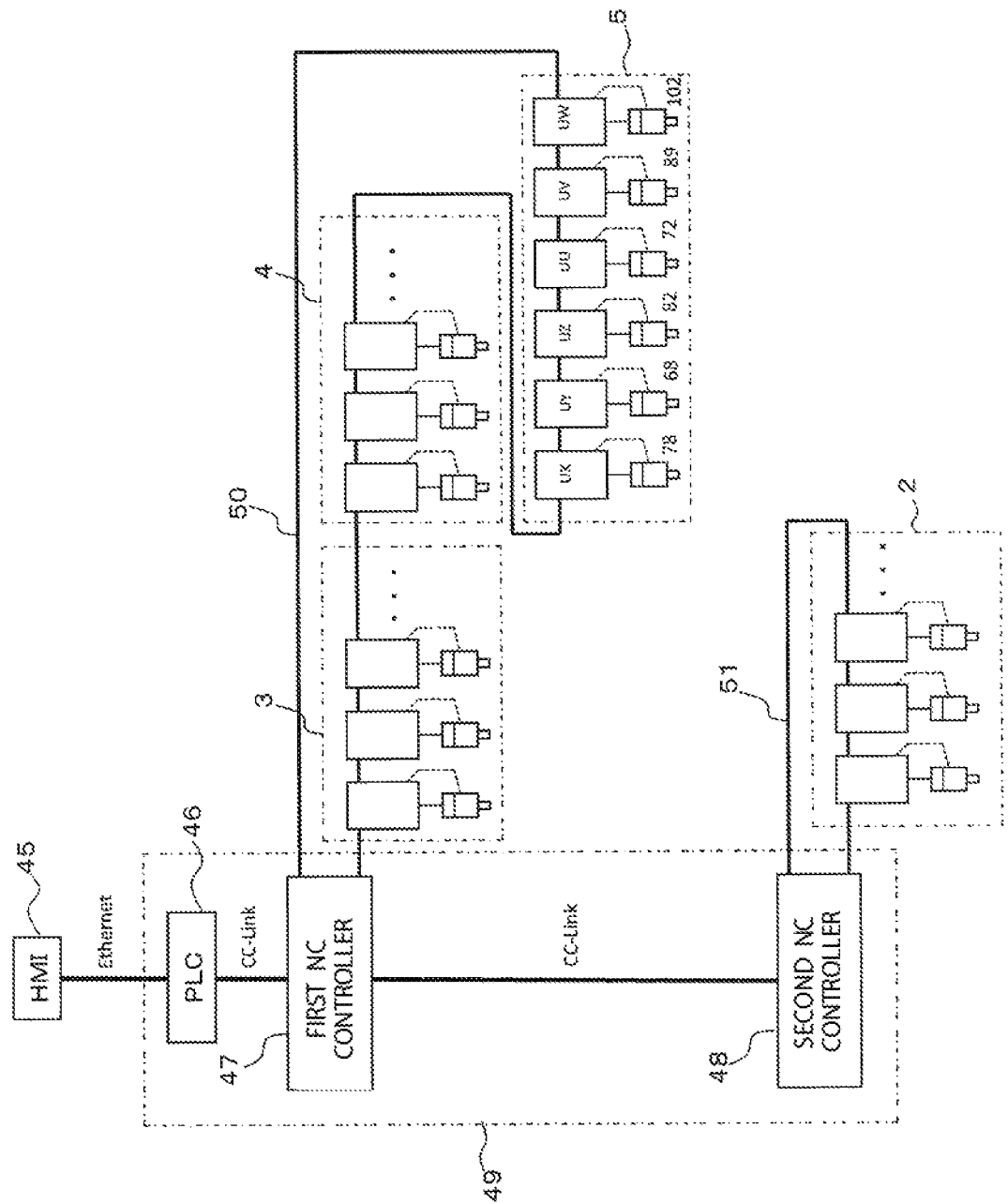
FIG. 14 is a block diagram schematically illustrating an electrical configuration of the coil segment forming apparatus in the embodiment of FIG. 1.

FIG. 14 shows an electrical configuration of the coil segment forming apparatus in this embodiment. As shown in the figure, the apparatus has a human-machine interface (HMI) 45 including an input and display means such as a touch panel, for inputting control data for shaping the wire rod, for instructing reading of control data stored in a memory, for instructing modification of the control data stored in the memory, for instructing start of the NC control, or for instructing end of the NC control for example. The HMI 45 is connected to a programmable logic controller (PLC) 46 through Ethernet (registered trademark). A first NC controller 47 and a second NC controller 48 are connected to the PLC 46 by means of a high-speed network such as CC-Link. The PLC 46 is provided with a memory for storing at least control data and control program for shaping coil segments with various kinds of shape, a central processing unit (CPU) and an input-output interface. The CPU transfers control data indicated by the program to the first NC controller 47 and the second NC controller 48. The first NC controller 47 expands control data of a length of the wire rod, a center angle of the coil segment, a pitch, and a shoulder angle of the coil segment, and data for executing multiaxial control with respect to the first bending section 4. The first NC controller 47 also expands control data of forming of the curved shape and forming of the crank-shaped step part of the linking portion 17a, and data for executing multiaxial control with respect to the second bending section 5. The second NC controller 48 expands control data of coil arrangement or else in the coil assembling section 2. A control unit 49 for controlling the wire rod providing section 3, the first bending section 4, the second bending section 5 and the coil assembling section 2 is configured by the PLC 46, the first NC controller 47 and the second NC controller 48.

The first NC controller 47 is connected to the wire rod providing section 3, the first bending section 4 and the second bending section 5 through an optical communication cable 50 used for establishing servo-link. In the wire rod providing section 3, the first bending section 4 and the second bending section 5, a plurality of amplification and drive circuits are connected to the optical communication cable 50, and a plurality of servomotors are connected to the plurality of amplification and drive circuits, respectively. Signal lines from encoders mechanically coupled with the plurality of servomotors are connected to the plurality of amplification and drive circuits, respectively.

In this embodiment, as aforementioned, the second bending section 5 adopts the 6-axes control configuration, and therefore the amplification and drive circuit of the servomotor 78 for UX direction drive, the amplification and drive circuit of the servomotor 68 for UY direction drive, the amplification and drive circuit of the servomotor 82 for UZ direction drive, the amplification and drive circuit of the servomotor 72 for UU direction drive, the amplification and drive circuit of the servomotor 89 for UV direction drive, and the amplification and drive circuit of the servomotor 102 for UW direction drive are connected to the optical communication cable 50.

The second NC controller 48 is connected to the coil assembling section 2 through an optical communication cable 51 used for establishing servo-link. In the coil assembling section 2, a plurality of amplification and drive circuits are connected to the optical communication cable 51, and a plurality of servomotors are connected to the plurality of amplification and drive circuits, respectively. Signal lines from encoders mechanically coupled with the plurality of servomotors are connected to the plurality of amplification and drive circuits, respectively.

Figure 15:
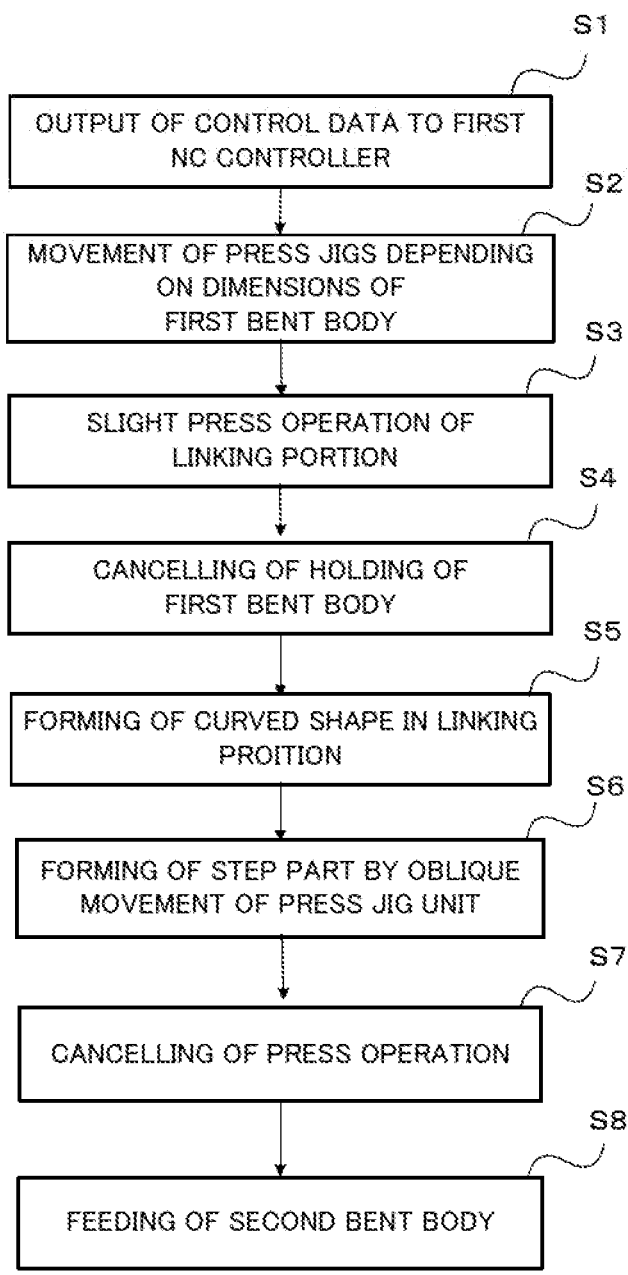
FIG. 15 is a flow chart schematically illustrating control processes of bending operations of the second bending section in the embodiment of FIG. 1.

The PLC 46 and the first NC controller 47 control the second bending operation of the first bent body 17, namely the forming of the curved shape and the forming of the crank-shaped step part depending on steps shown in FIG. 15. Hereinafter, the second bending operation will be described in detail by using the flow chart of FIG. 15 and a timing chart of FIG. 16. It should be noted that the following description is in a case of performing the second bending for the first bent body with a small coil width or a short length in each side of its linking portion. In case of performing the second bending for the first bent body with a large coil width or a long length in each side of its linking portion is shown in the timing chart of FIG. 17.

First, the PLC 46 reads out from the memory series of control data for defining moving amount of each press jig with respect to the forming of the curved shape of the coil segment (first bent body) to be formed next, among various kinds of shape of coil segments, and moving amount of each press jig with respect to the forming of step part (Z bending) of the coil segment to be formed next, and outputs the control data to the first NC controller 47 (Step S1).

The first NC controller 47 thereby expands the received control data and performs NC control of a drive mechanism with the designated address. At first, NC control of the movement of the press jigs 53A, 53B, 54A and 54B depending on the dimensions (shape) of the first bent body 17 is performed (Step S2). More concretely, a control data with respect to the moving amount of the press jigs is expanded and output to the drive mechanisms 60A, 60B, 63A and 63B in the second bending section 5 to drive the corresponding servomotors and to move the press jigs so that a concave curved surface has a predetermined curvature factor by the press jigs 53A and 54A and that a convex curved surface has a predetermined curvature factor by the press jigs 53B and 54B. FIG. 4 (b) shows this state.

Then, the first NC controller 47 performs NC control for slightly pressing the linking portion 17a of the first bent body 17 (slight press process is performed) (Step S3). That is, the first NC controller 47 expands the control data for press process and outputs the expanded control data to a drive mechanism in the second bending section 5 to drive the corresponding servomotor so that a slight press force is applied to prevent slippage of the first bent body 17 from occurring.

Then, the first NC controller 47 performs NC control for cancelling the holding of the first bent body 17 by the hold member 13 (Step S4). That is, the first NC controller 47 expands the control data for releasing the first bent body 17 from the hold member 13 and outputs the expanded control data to a drive mechanism of the hold member 13 to the air cylinder so that the holding or chucking of the slot insertion portions 17b and 17c is canceled.

Figure 16:
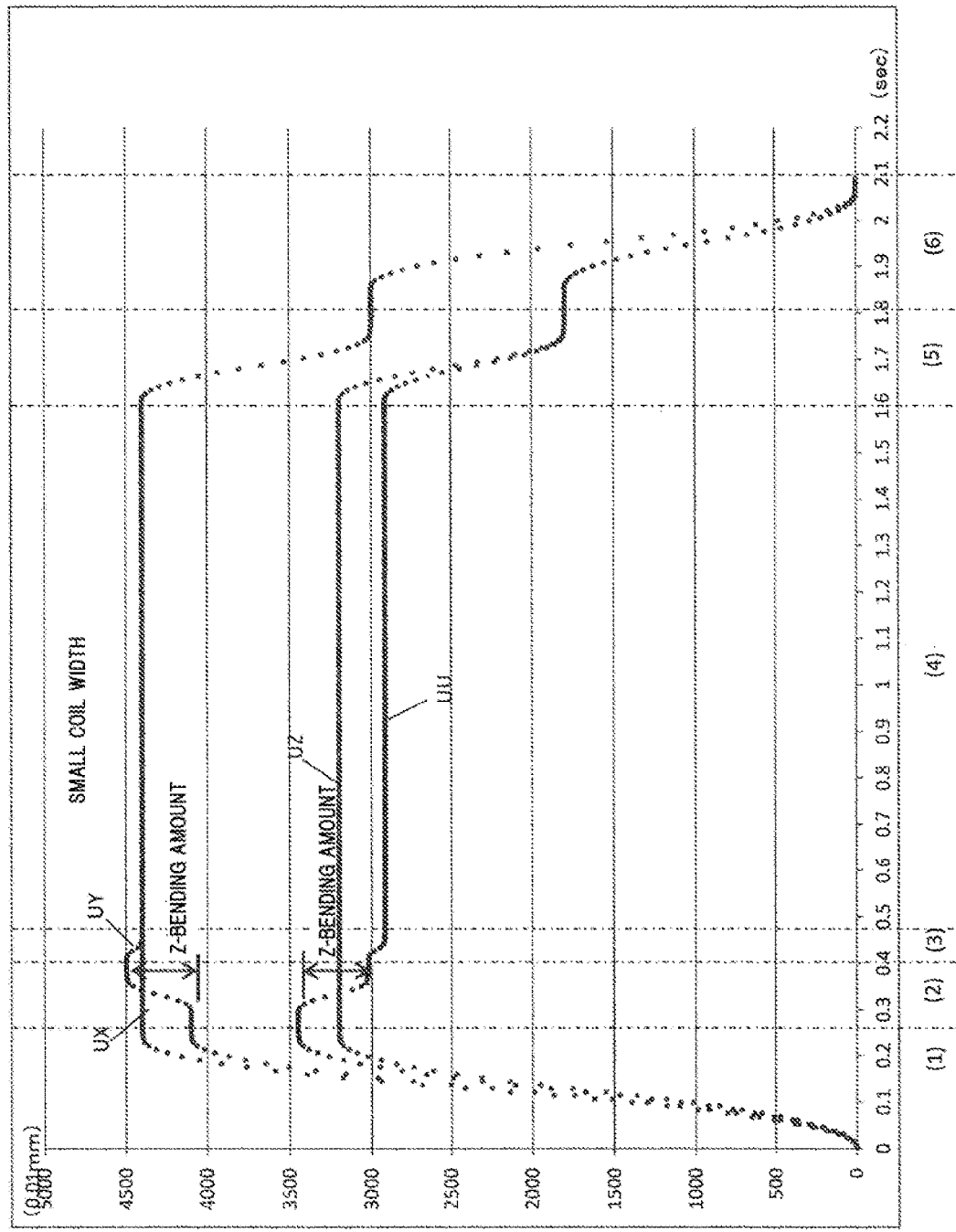
FIG. 16 is a timing chart illustrating the control processes of second bending operations of the first bent body with the small coil width in the embodiment of FIG. 1.

Then, the first NC controller 47 performs NC control for curved-shape forming to bend the linking portion 17a in a curved shape (Step S5). That is, the first NC controller 47 expands the control data for pressing and outputs the expanded control data to the drive mechanisms 60A, 60B, 63A and 63B to drive the corresponding servomotor so as to perform the press processes. The domain (1) in FIG. 16 represents the operating states of the drive mechanisms 60A, 60B, 63A and 63B.

In such bending operations or pressing operations, so-called spring-back phenomenon in which the bent amount is slightly restored by the elasticity of the materials when the pressing force is released after having bent may occur. The quantity of return by this spring-back is different due to parameters such as materials of the wire rod 6 and a curvature factor of the curved shape. According to the conventional bending method of bending the wire rod by using the press die, even if the forming surface of the press die was designed by considering the influence of the spring-back, undesirable spring-back influence was sometimes remained in the bent wire rod and thus the press die had to be redesigned and made again. Such redesign and remake invited forming cost of the press die, shaping cost of the coil segment and also manufacturing cost of the electrical rotating machine to increase. In case that the remake of the press die became multiple times, the manufacturing cost was extremely increased. Whereas according to this embodiment, because such spring-back influence can be cancelled by correcting the control data, for example, prolonging the press time or increasing the moving amount of the press jigs in the pressing direction, no remake of the press die is necessary at all. In modifications of the present invention, control data for suppressing the spring-back influence may be preliminarily obtained by an experiment using the aforementioned parameters and a control table used in the NC control for bending the wire rod 6 may be made in accordance with the obtained control data, or shaping conditions for suppressing the spring-back influence may be automatically set depending on a kind of the input wire rod 6 or on a shape of the first bent body 17.

Then, the first NC controller 47 performs NC control for forming a crank-shaped step part in the linking portion 17a by moving the press jig unit 55 (press jigs 53A and 53B) in an oblique direction by means of the drive mechanism 61 (Step S6). That is, the first NC controller 47 expands the control data for forming the step part and outputs the expanded control data to the drive mechanism 61 to drive the servomotor 89 so as to move the movable base 59 to the right direction and to drive the servomotors 68 and 72 so as to move the press jigs 53A and 53B in synchronization with each other to the upper direction, and therefore to move the press jig unit 55 consisting of the press jigs 53A and 53B to the right oblique upper direction. The domain (2) in FIG. 16 represents operating states of only the drive mechanisms 60A and 60B.

After forming of the step part, the first NC controller 47 performs NC control for cancelling the press operation (Step S7).

That is, the first NC controller 47 expands the control data for moving the left press jigs 53A and 53B and outputs the expanded control data to the drive mechanisms 60A and 60B to drive the servomotors 68 and 72 so that the press jigs 53A and 53B leave the press position. The domain (3) in FIG. 16 represents operating states of the drive mechanisms 60A and 60B.

At the timing when the left press jigs 53A and 53B leave the press position, the first NC controller 47 performs NC control of preparation for dismounting and feeding or transferring the second bent body 17 namely a second bending-finished wire rod to the coil assembling section 2 (Step S8). That is, the first NC controller 47 expands the control data for feeding and outputs the expanded control data to a drive mechanism of a loader (not shown) to drive the air cylinder so as to hold the second bent body 17 by the pair of chucks. The domain (4) in FIG. 16 represents operating states of each drive mechanism in this case.

Thereafter, the first NC controller 47 resets the drive mechanism in the second bending section 5 to make provision against the second bending operation of the next coil segment (first bent body). More concretely, the movement plates 73 and 83 are returned to the UY (−) direction and the UX (−) direction as half by the drive mechanisms 60A and 63A, respectively, and the movement plates 74 and 84 are returned to the UU (−) direction and the UZ (−) direction as half by the drive mechanisms 60B and 63B, respectively. The domain (5) in FIG. 16 represents operating states of the drive mechanisms 60A, 60B, 63A and 63B in this case. Then, the movement plates 73 and 83 are completely returned to predetermined positions in the UY (−) direction and the UX (−) direction, namely to the home positions shown in FIG. 6, by the drive mechanisms 60A and 63A, and the movement plate s74 and 84 are completely returned to the predetermined position (the home positions) in the UU (−) direction and the UZ (−) direction by the drive mechanisms 60B and 63B. The domain (6) in FIG. 16 represents operating states of the drive mechanisms 60A, 60B, 63A and 63B in this case.

Explanation of NC control of the first bending section 4 by the first NC controller 47 and NC control of the coil assembling section 2 by the second NC controller 48 is omitted in this specification.

In the above-mentioned embodiment, the crank-shaped step part is formed on the top of the linking portion 17a of the first bent body 17. However, a gap for lane change to shift or misalign the pair of slot insertion portions of the first bent body 17 with each other in the radial direction of the slot may be formed in any shape such as smooth surface shape without being limited to the step.

Figure 17:
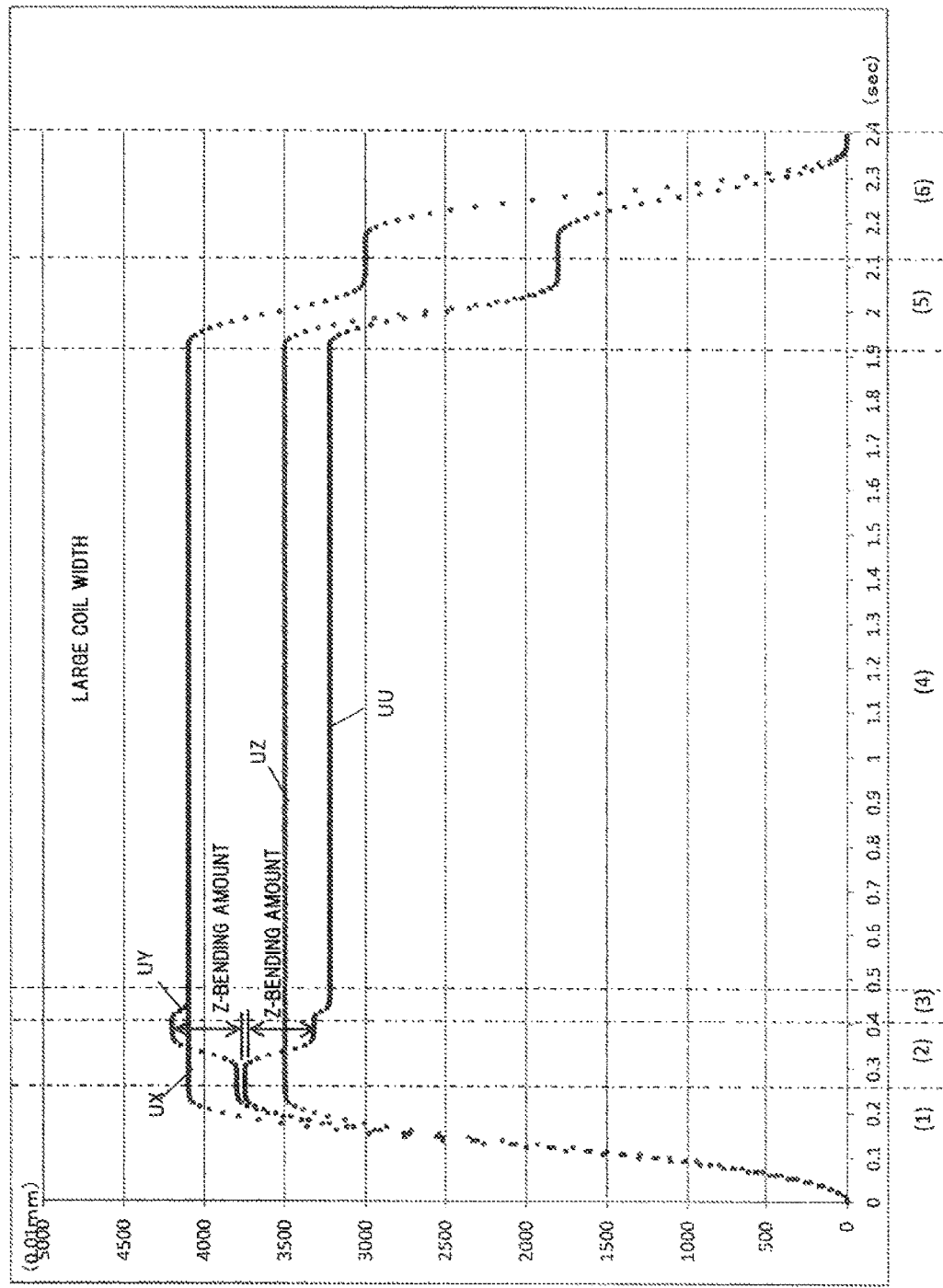
FIG. 17 is a timing chart illustrating the control processes of the second bending operations of the first bent body with the large coil width in the embodiment of FIG. 1.

FIG. 17 shows a timing chart of the control processes of the first NC controller 47 when the second bending operation of the first bent body with the large coil width is performed. In this second bending operation of the first bent body with the large coil width, similar control as that in the above-mentioned embodiment is performed, and similar operation/advantage can be obtained.

Many widely different embodiments of the present invention may be constructed without departing from the spirit and scope of the present invention. It should be understood that the present invention is not limited to the specific embodiments described in the specification, except as defined in the appended claims.

DENOTATION OF REFERENCE NUMERALS

1: coil segment forming apparatus
2: coil assembling section
3: wire rod providing section
4: first bending section
5: second bending section
6: wire rod
7: bobbin
8: feed direction switching section
9 corrective transporting section
9a, 9b: roller pair
10: peeling section
11: cutting section
12: feed mechanism
13: hold member
17: first bent body
17a: linking portion
17b, 17c: slot insertion portion
45: HMI
46: PLC
47: first NC controller
48: second NC controller
49: control unit
50, 51: optical communication cable 53A, 53B, 54A, 54B: press jig
53A-1, 53B-1, 54A-1, 54B-1: pressing surface
53A-2, 53B-2, 54A-2, 54B-2: bolt-insertion hole
55, 56: press-jig unit
57: step portion
58a: opening portion
58: fixed base
59: movable base
60A, 60B, 61, 63A, 63B, 64: drive mechanism
62: rotation base
65, 69, 75, 79, 85: boll screw portion
66, 70, 76, 80, 86, 87, 100: nut portion
67, 71, 77, 81: slider
68, 72, 78, 82, 89, 102: servomotor
73, 74, 83, 84: movement plate
88: slide plate
90, 95, 96: rail member
91, 97, 98, 99: slide member
92, 103: cam follower
93, 101a: engagement groove
94: bracket
101: engagement member
C: bending centerline

The invention claimed is:

1. A coil segment forming apparatus comprising a bending section having a plurality of pairs of press jigs and a plurality of drive mechanisms for moving respectively said plurality of pairs of press jigs based on moving amounts respectively set depending on forming conditions of a coil segment to be formed, wherein
the coil segment to be formed initially has a first bent body consisting of a pair of slot insertion portions that are substantially parallel to each other and a linking portion connecting said pair of slot insertion portions formed in the same plane,
said plurality of pairs of press jigs are arranged to oppose to each other in directions intersecting with said same plane for pinching and pressing said linking portion,
said plurality of drive mechanisms are configured to move said plurality of pairs of press jigs in a direction perpendicular to said same plane to bend said linking portion to form a curved shape, and
drive mechanisms among said plurality of drive mechanisms are further configured to move a pair of press jigs among said plurality of pairs of press jigs in a direction obliquely intersecting with said same plane, after the bending of said linking portion to form said curved shape, to form a misalignment in said linking portion.

2. The coil segment forming apparatus as claimed in claim 1, wherein said plurality of drive mechanisms are configured to move said plurality of pairs of press jigs based on data of the set moving amounts, respectively.

3. The coil segment forming apparatus as claimed in claim 1, wherein said drive mechanisms, among said plurality of drive mechanisms, for moving the pair of press jigs in the direction obliquely intersecting with said same plane are configured to move the pair of press jigs in one direction in said same plane and simultaneously to move the pair of press jigs in a direction perpendicular to said one direction.

4. The coil segment forming apparatus as claimed in claim 1, wherein another pair of press jigs, among said plurality of pairs of press jigs, is capable of rotating in a plane perpendicular to said same plane and capable of changing a curvature factor of the curved shape of said linking portion by said rotating.

5. The coil segment forming apparatus as claimed in claim 1, wherein each pair of said plurality of pairs of press jigs comprises a concave shaped press jig having a curved concave press surface and a convex shaped press jig having a curved convex press surface.

6. A manufacturing apparatus of an electrical rotating machine comprising:
a wire rod providing section that supplies a linear wire rod;
a first bending section that bends the linear wire rod supplied from said wire rod providing section into a predetermined shape consisting of a pair of slot insertion portions that are substantially parallel to each other and a linking portion for connecting said pair of slot insertion portions formed in the same plane;
a second bending section that bends the wire rod bent by said first bending section in a plane perpendicular to said same plane to form a coil segment; and
a coil assembling section that assembles the coil segment formed by said second bending section in line with slots of the electrical rotary machine, wherein
said second bending section includes a plurality of pairs of press jigs arranged to oppose to each other in directions intersecting with said same plane for pinching and pressing said linking portion, and a plurality of drive mechanisms for moving respectively said plurality of pairs of press jigs in directions intersecting with said same plane based on moving amounts respectively set depending on forming conditions of the coil segment to be formed,
said plurality of drive mechanisms are configured to move said plurality of pairs of press jigs in a direction perpendicular to said same plane to bend said linking portion to form a curved shape, and
drive mechanisms among said plurality of drive mechanisms are further configured to move a pair of press jigs among of said plurality of pairs of press jigs in a direction obliquely intersecting with said same plane, after the bending of said linking portion to form said curved shape, to form a misalignment in said linking portion.

7. The manufacturing apparatus of an electrical rotating machine as claimed in claim 6, wherein said plurality of drive mechanisms are configured to move said plurality of pairs of press jigs based on data of the set moving amounts, respectively.

8. The manufacturing apparatus of an electrical rotating machine as claimed in claim 6, wherein said drive mechanisms, among said plurality of drive mechanisms, for moving the pair of press jigs in a direction obliquely intersecting with said same plane are configured to move the pair of press jigs in one direction in said same plane and simultaneously to move the pair of press jigs in a direction perpendicular to said one direction.

9. The manufacturing apparatus of an electrical rotating machine as claimed in claim 6, wherein another pair of press jigs, among said plurality of pairs of press jigs, is capable of rotating in a plane perpendicular to said same plane and capable of changing a curvature factor of the curved shape of said linking portion by said rotating.

10. The manufacturing apparatus of an electrical rotating machine as claimed in claim 6, wherein each pair of said plurality of pairs of press jigs comprises a concave shaped press jig having a curved concave press surface and a convex shaped press jig having a curved convex press surface.

* * * * *